(12) United States Patent
Englander et al.

(10) Patent No.: US 12,337,758 B1
(45) Date of Patent: *Jun. 24, 2025

(54) MIRROR HEAD FOR VEHICLE WITH VISUAL AND/OR AUDIO INDICATORS AND ILLUMINATION SYSTEM

(71) Applicant: Rosco, Inc., Jamaica, NY (US)

(72) Inventors: Benjamin Englander, Woodmere, NY (US); Julian Serer, Plainview, NY (US); Michael Lipani, Cold Spring Harbor, NY (US); John Polimeni, New York, NY (US)

(73) Assignee: Rosco, Inc., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,749

(22) Filed: Feb. 28, 2023

Related U.S. Application Data

(63) Continuation of application No. 16/811,445, filed on Mar. 6, 2020, now Pat. No. 11,618,385.
(60) Provisional application No. 62/815,859, filed on Mar. 8, 2019.

(51) Int. Cl.
| | |
|---|---|
| *B60R 1/08* | (2006.01) |
| *B60R 1/06* | (2006.01) |
| *B60R 1/12* | (2006.01) |

(52) U.S. Cl.
CPC ............... *B60R 1/082* (2013.01); *B60R 1/06* (2013.01); *B60R 1/1207* (2013.01)

(58) Field of Classification Search
CPC .. B60R 1/06; B60R 1/08; B60R 1/082; B60R 1/1207; B60R 2001/1223; B60R 2001/1253

USPC .......................................... 359/838, 843, 868
See application file for complete search history.

(56) References Cited

U.S. PATENT DOCUMENTS

| | | | | |
|---|---|---|---|---|
| 2,561,582 | A * | 7/1951 | Marbel .................. | B60Q 1/425 |
| | | | | 362/540 |
| 4,475,100 | A * | 10/1984 | Duh ...................... | B60Q 1/2665 |
| | | | | 362/135 |
| 6,293,679 | B1 | 9/2001 | Schmidt | |
| 7,080,913 | B2 * | 7/2006 | Henion ................. | B60R 1/1207 |
| | | | | 359/872 |
| 8,899,764 | B2 | 12/2014 | Ung | |
| 9,302,625 | B2 | 4/2016 | Englander | |
| 9,511,714 | B2 | 12/2016 | Schmidt | |
| 9,908,470 | B1 | 3/2018 | Englander | |

(Continued)

*Primary Examiner* — Ricky D Shafer
(74) *Attorney, Agent, or Firm* — Manatt, Phelps & Phillips, LLP

(57) ABSTRACT

A mirror assembly for vehicle is disclosed. The mirror assembly includes a housing, a retaining rim, and a mirror lens that is secured between the housing and the retaining rim. In one embodiment, the mirror has a visual indicator mounted to the retaining rim or housing. When an object or pedestrian is detected in a lane next to or in front of a vehicle, the visual indicator provides light signals or other type of warning to an operator driving the vehicle. In one embodiment, the mirror assembly has a speaker mounted to the housing. When an object or pedestrian is detected in a lane next to or in front of the vehicle, the speaker provides audio signals to warn an operator driving the vehicle. In another embodiment, the mirror assembly includes a housing, a shield attached to the housing, a mirror lens, and a visual indicator securely located, for example, in a channel of the shield, retaining rim and/or housing.

20 Claims, 27 Drawing Sheets

(56) References Cited

U.S. PATENT DOCUMENTS

| | | | |
|---|---|---|---|
| 11,618,385 B1* | 4/2023 | Englander | B60R 1/06 |
| | | | 359/838 |
| 2004/0178892 A1* | 9/2004 | Anderson | B60Q 1/2665 |
| | | | 340/435 |
| 2010/0079883 A1 | 4/2010 | Englander | |
| 2010/0177523 A1* | 7/2010 | Bisnack | B60R 1/1207 |
| | | | 362/543 |
| 2011/0260845 A1* | 10/2011 | Henion | B60R 1/08 |
| | | | 340/435 |
| 2017/0210282 A1 | 7/2017 | Rodriguez Barros | |
| 2018/0272947 A1* | 9/2018 | Masckauchan | B60R 1/06 |
| 2020/0001792 A1* | 1/2020 | Herrmann | B60R 1/06 |

* cited by examiner

MIRROR HEAD FOR VEHICLE WITH VISUAL AND/OR AUDIO INDICATORS AND ILLUMINATION SYSTEM

INCORPORATION BY REFERENCE TO RELATED APPLICATIONS

This application is a continuation of U.S. patent application Ser. No. 16/811,445, filed Mar. 6, 2020, which claims the benefit of, and priority to, U.S. Provisional Application No. 62/815,859, filed Mar. 8, 2019. This application is related to U.S. patent application Ser. No. 11/617,902, filed Dec. 29, 2006, now U.S. Pat. No. 9,511,714. This application is also related to U.S. patent application Ser. No. 14/218,340, filed Mar. 18, 2014, now U.S. Pat. No. 9,302,625. This application is also related to U.S. patent application Ser. No. 15/448,432, filed Mar. 2, 2017, now U.S. Pat. No. 9,908,470. This application is also related to U.S. application Ser. No. 15/088,623, filed Apr. 1, 2016, and U.S. application Ser. No. 16/012,625, filed Jun. 19, 2018. All of the above applications are hereby incorporated herein by reference in their entirety.

BACKGROUND

This disclosure generally relates to a mirror head for vehicles. More specifically, the present disclosure relates to a mirror head with visual and/or audio indicator and illumination system.

SUMMARY

Various embodiments for mirror head for vehicle are provided. Vehicle mirror heads can play a vital role in vehicle operation. Such mirror heads can enable and/or provide visual inspections of surrounding areas for the vehicle operator or driver to properly or safely operate the vehicle. However, placement or location of the vehicle operator within the vehicle structure often makes direct line-of-sight to surrounding vehicle areas impractical. As vehicle size increases, so often does the difficulty of accurate visual inspections. Vehicles, such as school buses and commercial vans, typically have increased sizes and require visual inspection of areas in front and to the side of the vehicle.

Domed mirror lens may incorporate a varying radius of curvature from the center portion to one or more of the perimeter edges. The varying radius of curvature achieves a compacted wide field of view or viewing area within minimal space such that the vehicle operator can look forward of the vehicle with minimal blockage of vision. These mirrors with varying radius of curvature are commonly referred to as cross-view mirrors. Although the use of cross-view mirror designs has proven highly successful in the increase of viewing area while minimizing mirror size, present designs still can incorporate drawbacks. One of the drawbacks of cross-view mirror designs is from the reflection of the vehicle itself within the mirror. In many designs, the vehicle reflection is positioned within the center of the mirror and fills a significant amount of valuable viewing space. This results in a reduction of useful mirror surface area since the user does not commonly need to monitor reflection of the vehicle itself. Furthermore, images reflected in the mirror along the front and side of the vehicle often appear in the perimeter regions of the mirror. The reflections in the perimeter regions are reduced in proportion due to decreasing surface radius of curvature in these regions of the mirror. This can result in distorted images with reduced image proportions such as long thin images. The reduction in image proportion can result in an increased strain on the vehicle operator to identify the objects reflected in these regions.

Another problem with some cross-view mirrors, is that they include significant distortion of the reflected image. A cross-view mirror for buses and other vehicles having lens members created from the shape of a portion of an elliptical or circular toroid volumetric shape with an elliptical or circular cross-sectional shape is provided in U.S. Pat. No. 9,511,714, which is incorporated herein by reference. An asymmetric sectioned convex mirror for buses and other vehicles is provided in U.S. Pat. No. 9,302,625, which is incorporated herein by reference.

In addition, blind spot (or blind zone) detection and indication and/or a lane change aid system can be provided for a vehicle. Such systems can detect the presence of another vehicle or object in the lane next to the vehicle, where it may be difficult for the vehicle operator to determine whether or not there is another vehicle or object adjacent to the vehicle. Such a blind spot detection and/or a lane change aid system have a visual indicator that visually indicates the detection of another vehicle or object to the vehicle operator. The visual indicator, however, may itself become an obstruction.

We have determined, therefore, that it would be highly advantageous to have a mirror head that provides effective warnings to the vehicle operator when another vehicle or object in the lane next to the vehicle is presented while producing highest quality reflective images, with the least distortion, and at the same time increase the useful surface area and keep the overall mirror size to a minimum. We have determined that it would further be highly advantageous to have a mirror head that provides indicator lights on the mirrors designed to alert the vehicle operator in the case of a pedestrian presented in front of the vehicle bus. In additional we have determined that it would further be highly advantageous to have a mirror head that provides additional illumination to the area under the mirror head to light the ground in order to make it easier for the vehicle operator to see pedestrians, for example students, crossing right in front of the vehicle. In addition, we have determined that it would be advantageous to provide a mirror head with one or more advantages in accordance with one or more of the structures and/or methods described herein.

Additional, alternative and/or optional features and advantages are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

By use of the term "at least one of A and B" herein, it is intended to mean "one or more of X and Y."

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

BRIEF DESCRIPTION OF THE DRAWINGS

The foregoing summary, as well as the following detailed description of preferred embodiments of the assembly, will be better understood when read in conjunction with the appended drawings. For the purposes of illustrating certain aspects of the present invention, there are shown in the drawings preferred embodiments. It should be understood, however, that the assembly is not limited to the precise arrangement, structures, features, embodiments, aspects, and methods shown, and the arrangements, structures, features, embodiments, aspects and methods shown may be used singularly or in combination with other arrangements, structures, features, embodiments, aspects and methods. The drawings are not necessarily drawn to scale and are not in any way intended to limit the scope of the invention, but merely to clarify various exemplary embodiments of the invention.

DETAILED DESCRIPTION OF THE EMBODIMENTS

Figure 1A:
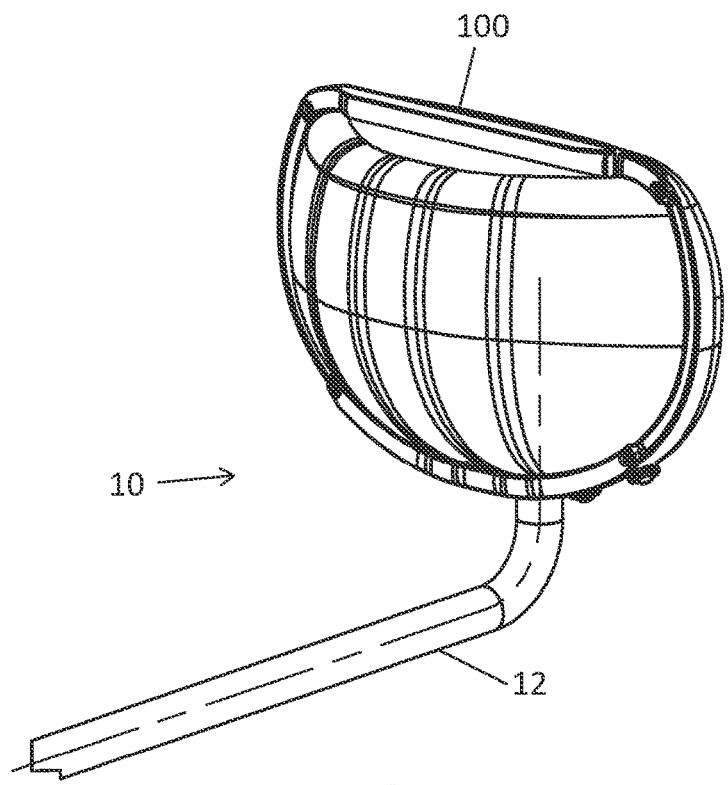
FIG. 1A is a front perspective view of a vehicle mirror assembly showing a mirror head mounted on a mirror mounting arm according to some embodiments of the present inventions.
Figure 1B:
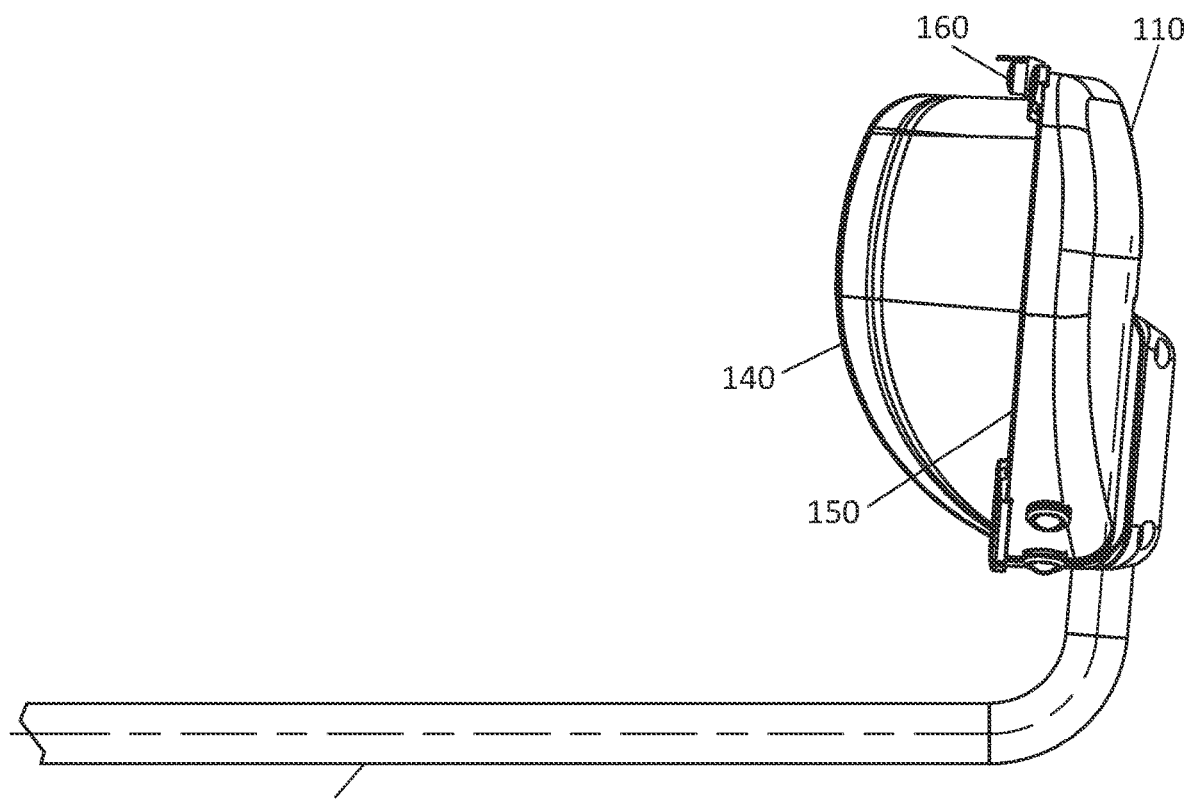
FIG. 1B is a side view of the vehicle mirror assembly of FIG. 1A.
Figure 1C:
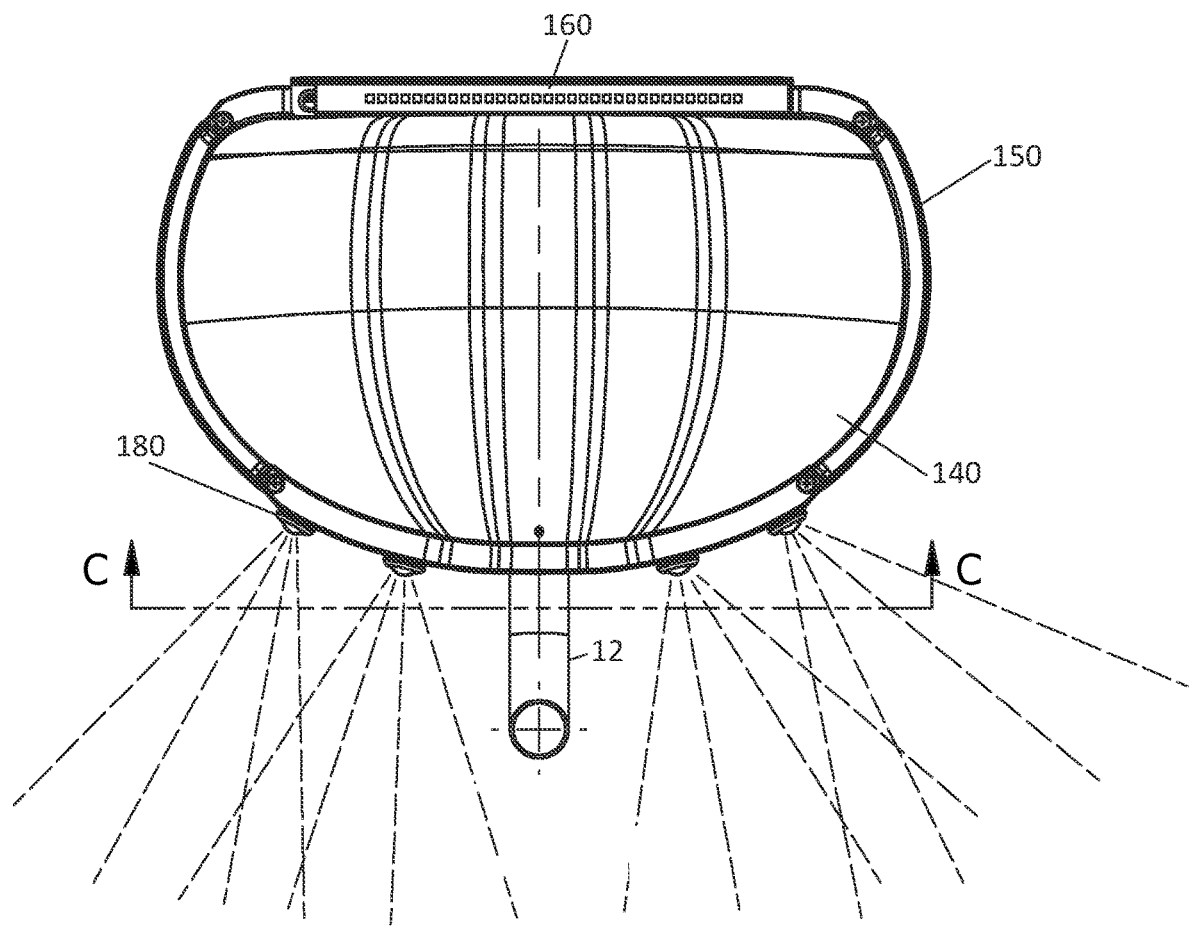
FIG. 1C is a front view of the vehicle mirror assembly of FIG. 1B.
Figure 1D:
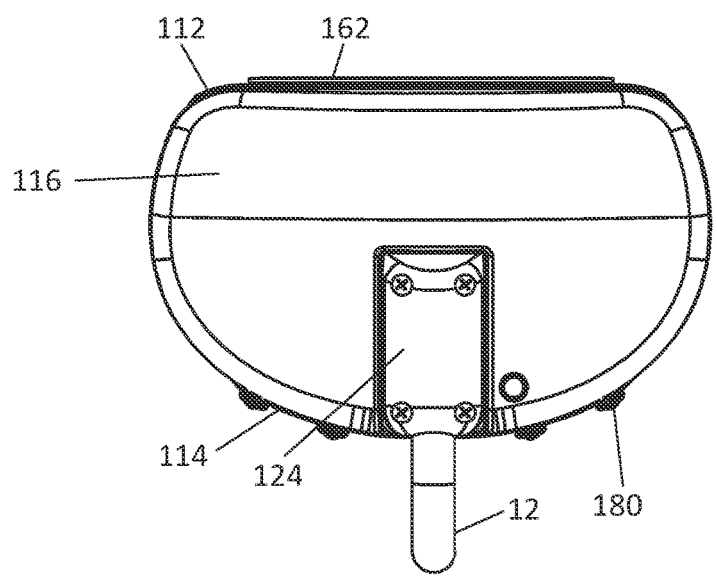
FIG. 1D is a rear view of the vehicle mirror assembly of FIGS. 1A and 1B.
Figure 1E:
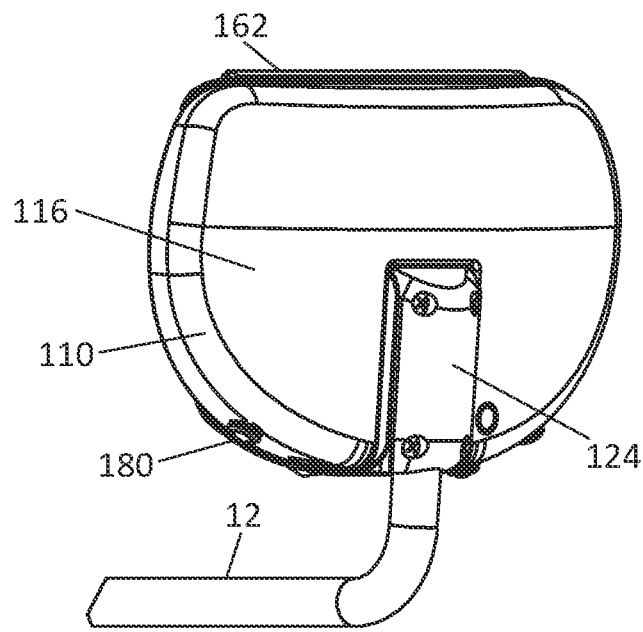
FIG. 1E is a rear perspective view of the vehicle mirror assembly of FIGS. 1A and 1B.
Figure 1F:
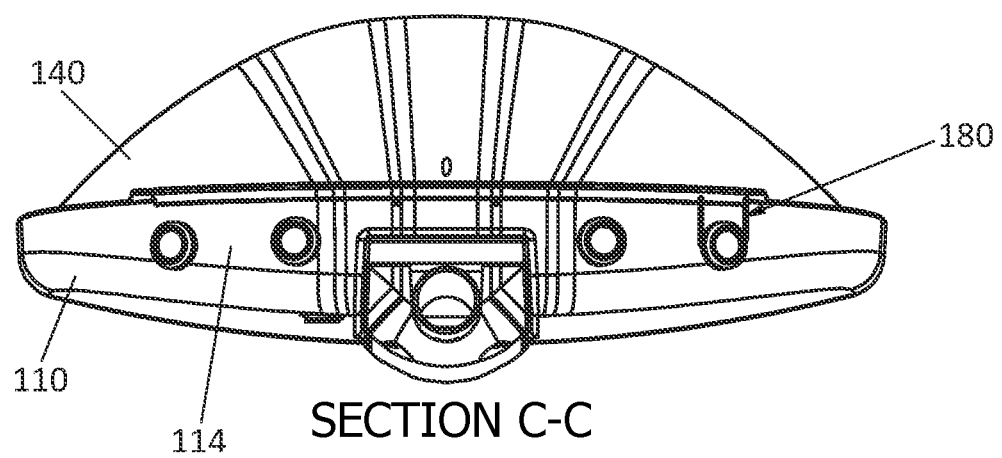
FIG. 1F is a front view of the vehicle mirror assembly of FIGS. 1A and 1B taken from line C-C of FIG. 1C.
Figure 2:
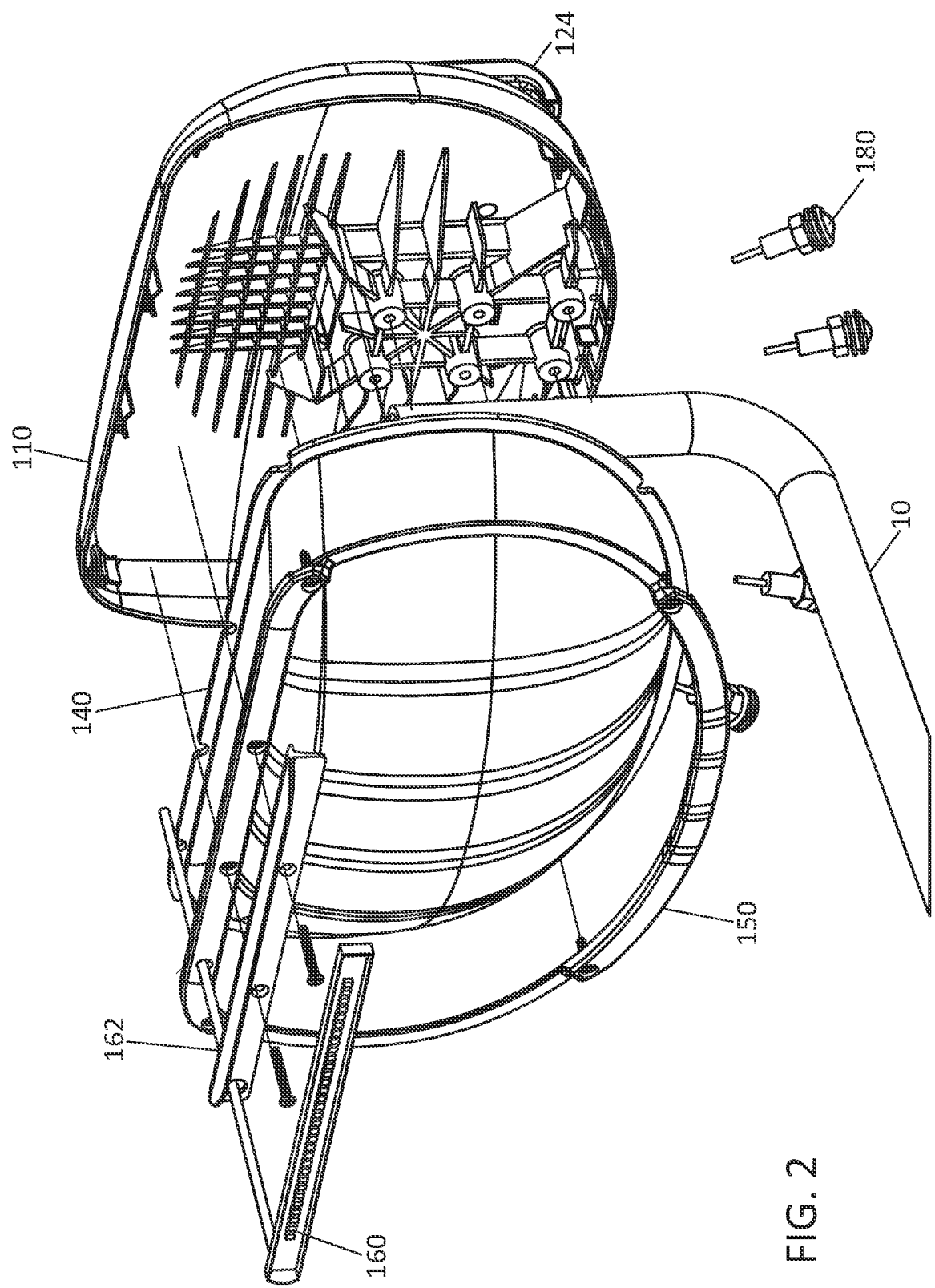
FIG. 2 is an exploded view of the vehicle mirror assembly of FIG. 1A showing the assembly components.
Figure 3:
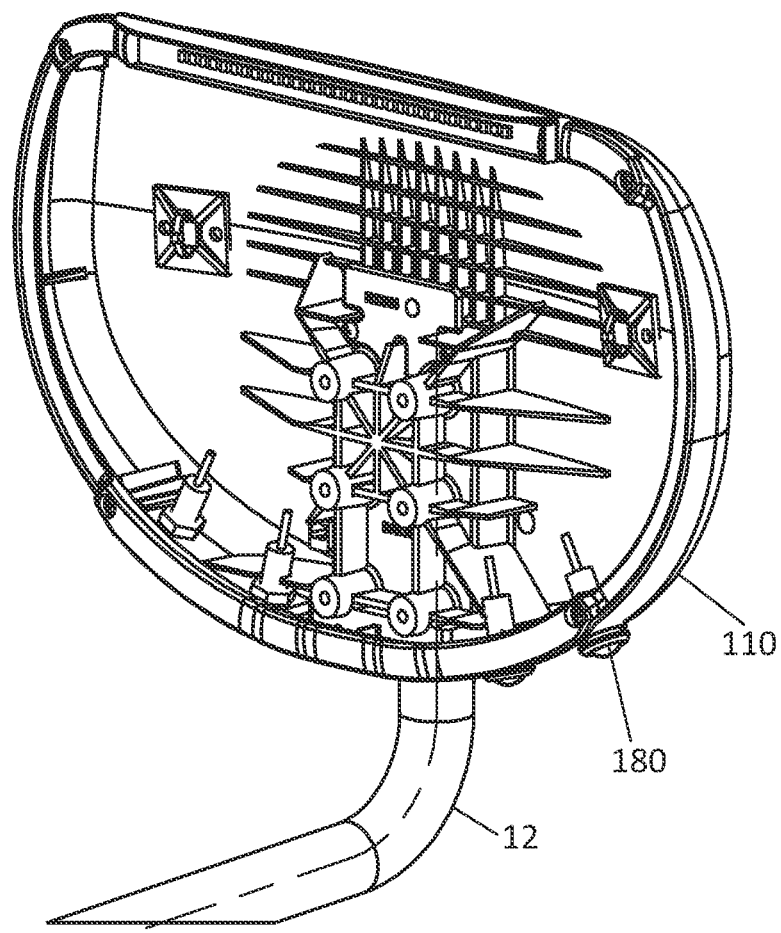
FIG. 3 is an illustration of the vehicle mirror assembly of FIG. 1A with the mirror lens being removed to show the interior side of the mirror head.
Figure 4:
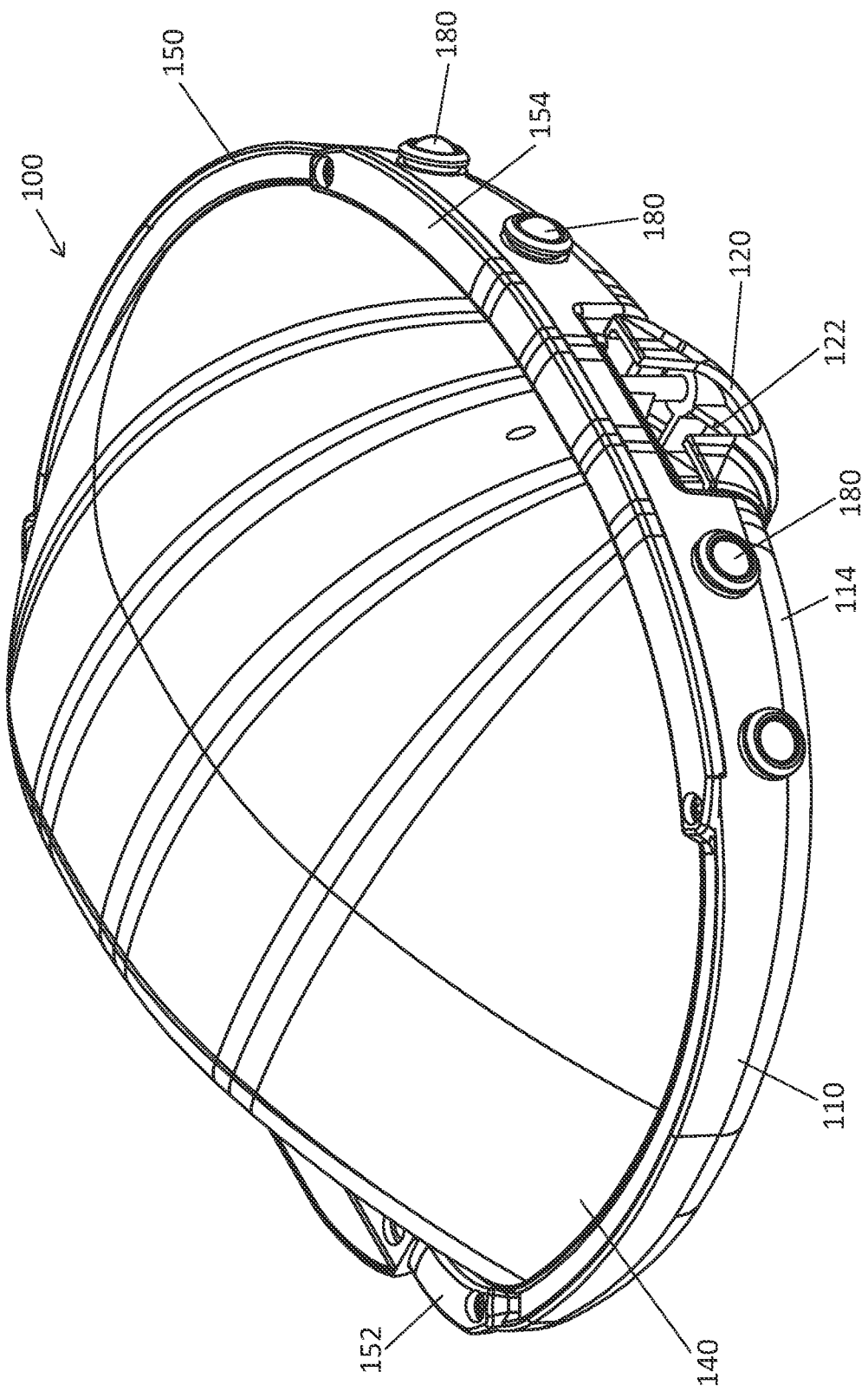
FIG. 4 is another perspective view of the mirror head of FIG. 1A with the mirror mounting arm being removed.
Figure 5A:
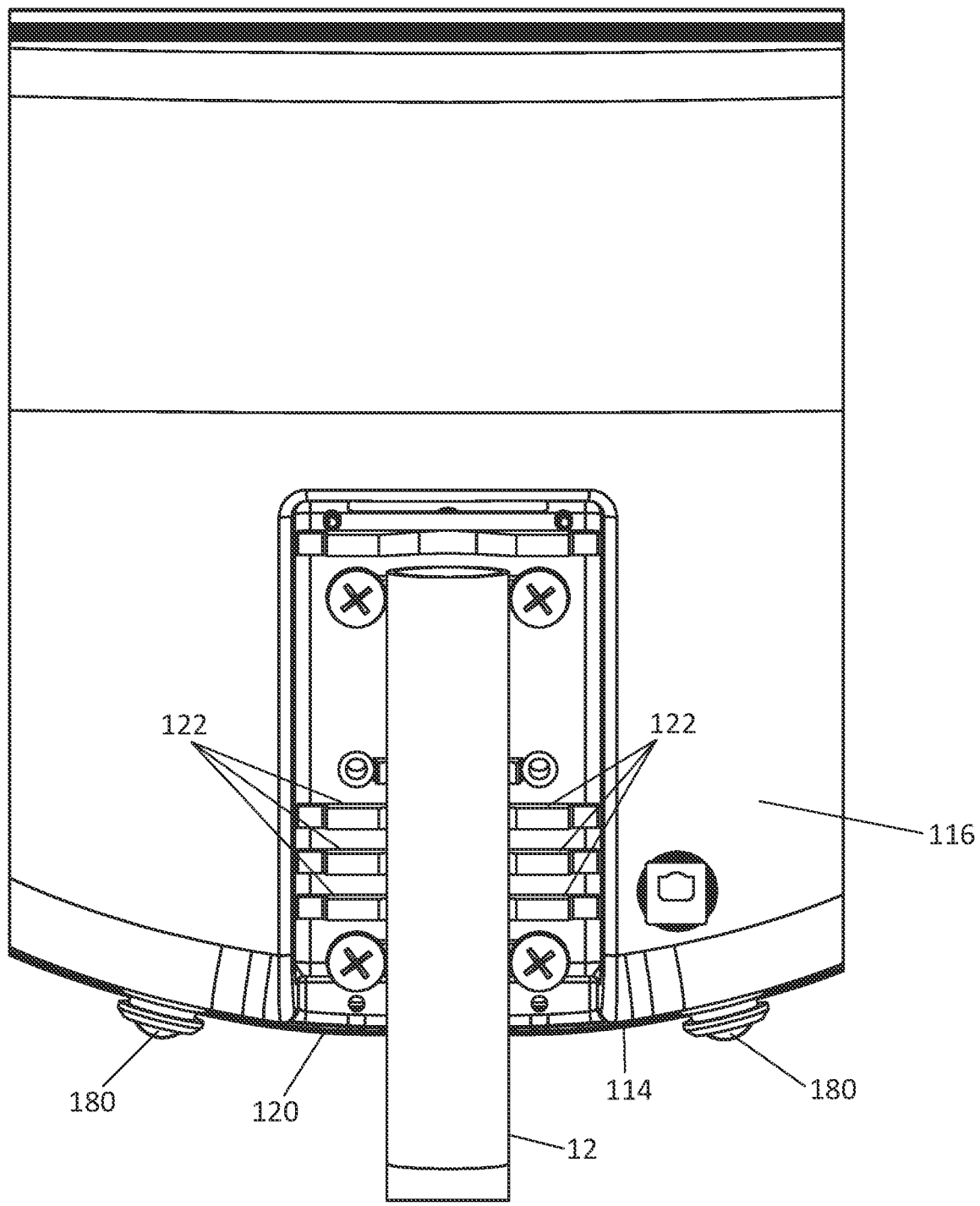
FIG. 5A is an enlarged view illustrating a portion of FIG. 1D with the cover been removed to show the tunnel for receiving the mounting arm.
Figure 5B:
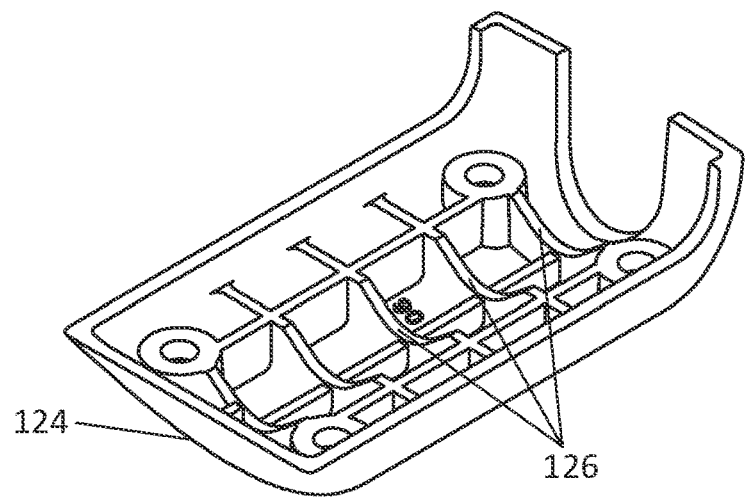
FIG. 5B is a perspective view of a cover according to some embodiments of the present inventions.
Figure 5C:
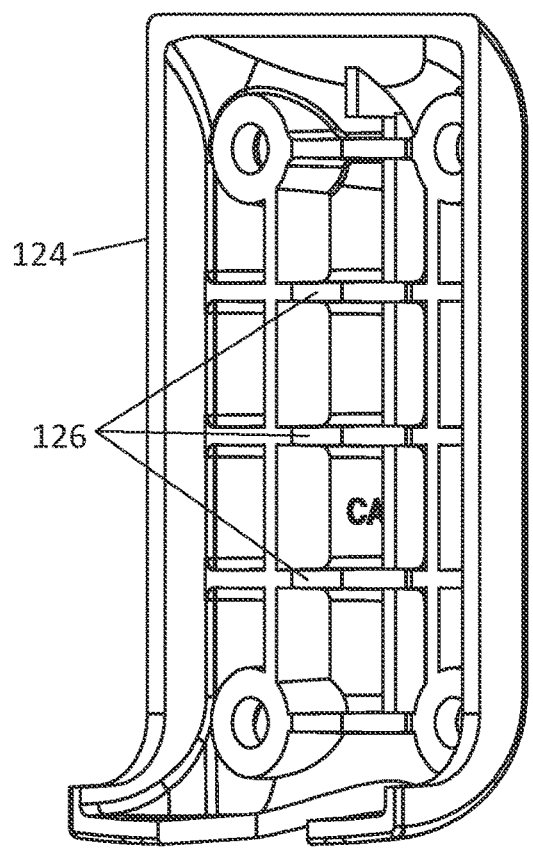
FIG. 5C is another perspective view of the cover of FIG. 5B.
Figure 6A:
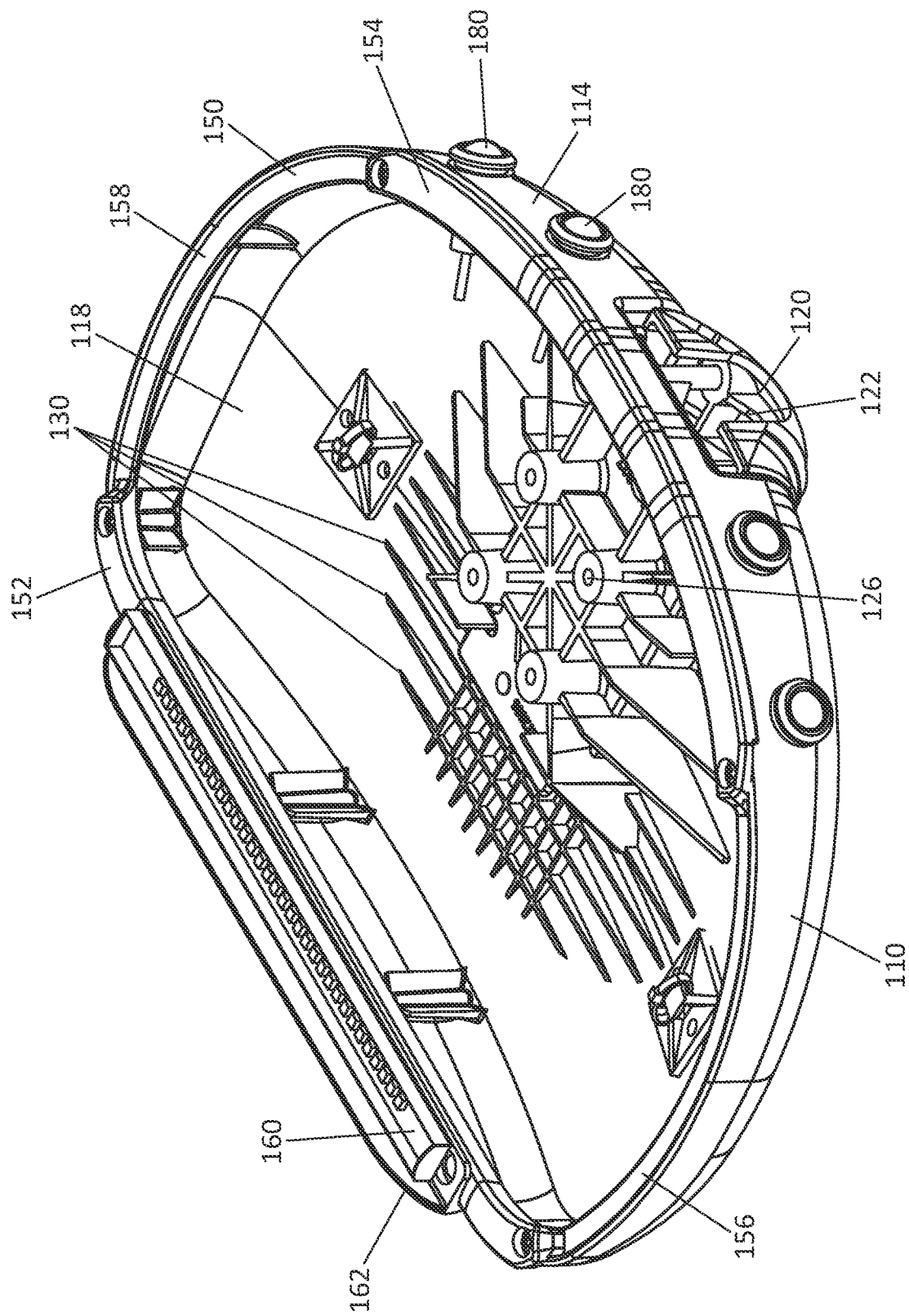
FIG. 6A is an illustration of the mirror head of FIG. 4 with the mirror lens being removed to show the interior side of the mirror head.
Figure 6B:
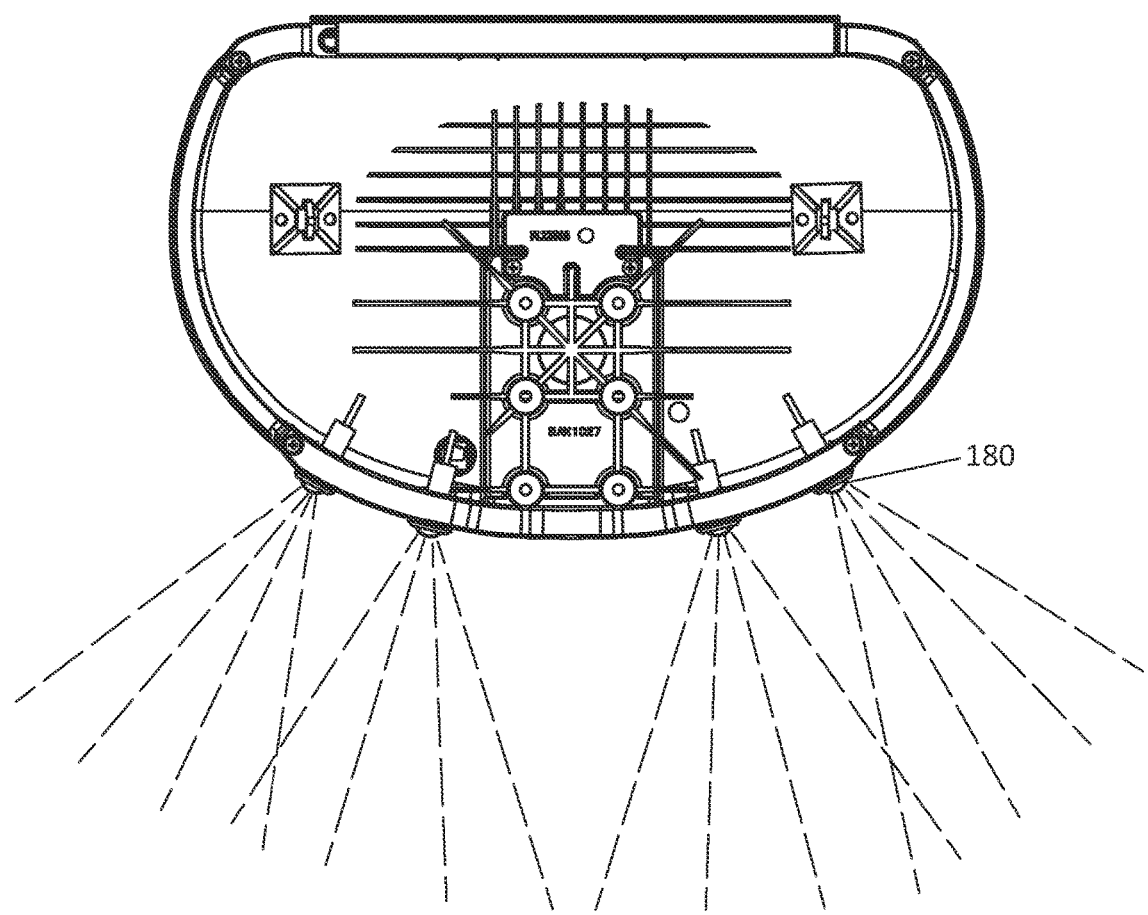
FIG. 6B is another illustration of the mirror head of FIG. 4 with the mirror lens being removed to show the interior side of the mirror head.
Figure 6C:
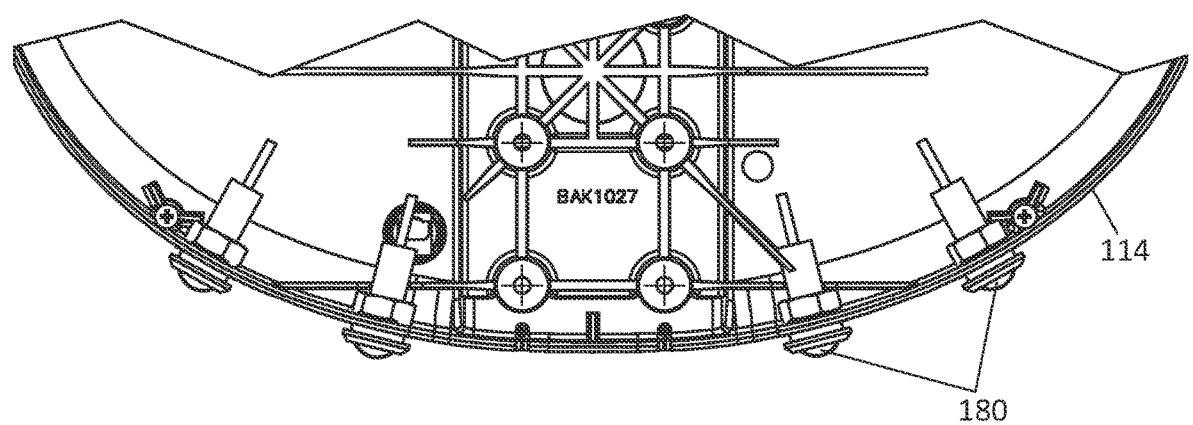
FIG. 6C is a partial enlarged view of FIG. 6B.

Before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

A mirror assembly for vehicle is disclosed. In some embodiments, the mirror assembly includes a housing, a retaining rim, and a mirror lens that is secured between the housing and the retaining rim. In one embodiment, the mirror has a visual indicator mounted to the retaining rim or housing. When an object or pedestrian is detected in a lane next to or in front of a vehicle, the visual indicator provides light signals or other type of warning to an operator driving the vehicle. In one embodiment, the mirror assembly has a speaker mounted to the housing. When an object or pedestrian is detected in a lane next to or in front of the vehicle, the speaker provides audio signals to warn an operator driving the vehicle. In another embodiment, the mirror assembly includes a housing, a shield attached to the housing, a mirror lens, and a visual indicator securely located, for example, in a channel of the shield, retaining rim and/or housing. In some embodiments, the visual indicator is connected to housing 110 or other support, such as the support arm, instead of, or in addition to, retaining rim 150. In some embodiments, the visual indicator and mount can be an integral component. In some embodiments, the visual indicator can be formed of different shapes and mounted to different areas of the housing. In some embodiments, the visual indicator can be formed of different shapes and mounted to different areas of the housing.

As shown in FIGS. 1A-7C, the vehicle mirror assembly 10 includes a mirror head 100 and a tubular mirror mounting arm 12. The mirror head 100 includes a mirror housing 110, a mirror lens 140 and a lens retaining rim 150. The mirror housing 110 includes a top side 112 and an opposing bottom side 114, a rear facing side 116, and an internal facing side 118. In the embodiment shown in FIGS. 1A-7C, the top side 112 is substantially flat. In other embodiments, curve, round or other shape can be used to form the top side 112. In addition, different shaped mirror housings and compatible mirror lenses may optionally be used.

The mirror housing 110 includes a tunnel or cavity 120 preferably opened through the bottom side 112 of the housing 110. In some embodiments, the tunnel 120 can be formed partially by the mirror housing 110 and partially by a cover or tubing clamp 124. In other embodiments, the tunnel or cavity 120 can be formed completely within or by the housing or be connected to the back of the housing. Support ribs 122 can be provided in the tunnel 120 for tunnel mounting the mirror assembly 100 to one end of the tubular mirror mounting arm 12, which in turn can be mounted to the vehicle. The tubular mirror mounting arm 12 can be provided with straight cut end for this tunnel type mounting. When the tunnel mount is used, a tubular mounting arm 12 is located along the internal support ribs 122. The mirror housing 110 is secured to the mounting arm 12 by the tunnel or arm mount cover 124. In some embodiments, the tunnel or arm mount cover 124 includes additional support ribs 126 to hold the mounting arm 12 securely in place.

In some embodiments, a spherical socket (not shown) preferably is provided in the tunnel 120 for ball stud type mounting. The tubular mirror mounting arm 12 can be provided with coined end with mounting hole for this ball stud type mounting. When the ball stud mount is used, a ball stud can be placed in the spherical socket. The ball stud is secured in place using a ball stud mount cover (not shown). In some embodiments, the stud portion of the ball stud protrudes through an opening in the ball stud mount cover and through an opening in the mounting arm. A nut holds the ball stud, the ball stud mount cover, and the mounting arm together. The mounting arm may be located between the mirror housing 110 and the ball stud mount cover. In some embodiments, the ball stud mount cover may be located between the mirror housing 110 and the mounting arm.

The configurations above enable at least two different methods (e.g., tunnel or ball stud) for mounting the mirror assembly to the vehicle. In some embodiments, this reduces the cost of producing and stocking mirrors as only a single mirror housing 110 needs to be produced for customers that use either type of mirror mount.

The mirror lens 140 has a perimeter that is sized to fit within the mirror housing 110. In some embodiments, the mirror lens 140 is a convex mirror dome lens as described in U.S. Pat. No. 9,302,625. In other embodiments, other types and/or shapes of mirror lens are used. The mirror lens 140 can be secured between the mirror housing 110 and the mirror rim 150 by, for example, screws or other connectors.

The lens retaining rim or edge 150 includes a top side 152, a bottom side 154, a left side 156 and a right side 158. The top side 152 and the bottom side 154 are preferably thicker than the left side 156 and the right side 158. Thus, the left side 156 and the right side 158 are relatively thinner so as to maximize the reflective mirror surface in the horizontal direction. This additional horizontal viewing area improves the ability of the vehicle operator to see images of a passenger moving, walking, and/or standing about different areas of the vehicle. In some embodiments, the lens retaining rim 150 is thinned along the bottom side 154. This provides and expanded viewing area below the mirror, for example, in front of the vehicle. In some embodiments, the rims and/or edges are of different widths and/shapes.

The internal facing side 118 of the housing 110 can include mounting screw holes 126, rim screw holes 128 and support ribs 130. The mounting screw holes 126 can be used to engage the screws holding the mirror housing 110 to the mounting arm. The rim screw holes 128 can be used to engage the screws holding the mirror housing 110 to the mirror rim. The support ribs 130 allow for a thinner mirror housing section which decreases both the weight and manufacturing cost of the mirror housing 110, while maintaining and/or increasing the housing strength. The support ribs 130 are used to maintain the shape of the mirror housing 110 while under load, such as wind loads while the vehicle is moving or while the mirror is being adjusted on the mirror mount. The support ribs 130 are sized for the expected load. For example, in some embodiments, the support ribs 130 adjacent to the mounting area are larger to maintain the structural integrity of the mirror housing. In some embodiments, the support ribs 130 along the top and sides of the mirror housing 110 are smaller as the loads the dynamic loads are less in these areas. The smaller support ribs 130 in these areas, again allow for reduced weight and manufacturing cost of the mirror housing 110.

A visual indicator 160 is advantageously mounted at or on the top side 152 of the lens retaining rim 150. The visual indicator 160 can be attached or mounted to a visual indicator mount 162, which in turn is attached or mounted to the lens retaining rim 150. In some embodiments, the visual indicator is connected to housing 110 or other support, such as the support arm, instead of, or in addition to, retaining rim 150. In some embodiments, the visual indicator and mount can be an integral component. In some embodiments, the visual indicator can be formed of different shapes and mounted to different areas of the housing. In some embodiments, this visual indicator 160 is connected electronically with a blind spot detection system and/or a lane change aid system to detect the presence of another vehicle or object in the lane next to and/or in the vicinity of the vehicle, where it may be difficult for the vehicle operator to determine whether or not there is another vehicle or object adjacent to the vehicle. In some embodiments, the blind spot detection system, lane change system and/or other detection system advantageously detects the presence of an object or pedestrian, for example, a student, presented right in front of a vehicle with a relative high center of gravity or body structure, e.g., a bus, a tractor, a truck, where it may be difficult for the vehicle operator to determine whether or not there is any pedestrians located right in front of the vehicle. The visual indicator 160 can include one or more light emitting diodes (LEDs). When the system detects the presence of another vehicle or object in the lane next to the vehicle, or other situations programmed into the system, the visual indicator 160 can warn the vehicle operator by sending light signals, for example flashing or beacon, until the system determines that no other vehicle or object, or other situations programmed into the system, is presented in the lane next, near to, or in front of the vehicle. In the configuration described above, the lighting of the visual indicator 160 will advantageously not block or obstruct any portion or significant portion of the rear view reflected by the mirror. As a result, useful mirror surface area will not be reduced or maximized while the visual indicator 160 is providing warning to the vehicle operator. In other embodiments, two or more different types of illumination may be provided depending on the detection and/or exterior conditions, such as weather, time of day, environment and the like. For example, if the time of day is late, the illumination system might be activated at a low lighting level either continuously or responsive to certain trigger conditions described below. However, the illumination system can optionally include a different lighting pattern, strobe emission, ambience and/or color of light should the presence of a pedestrian or other dangerous condition be detected, as described below.

Figure 10:
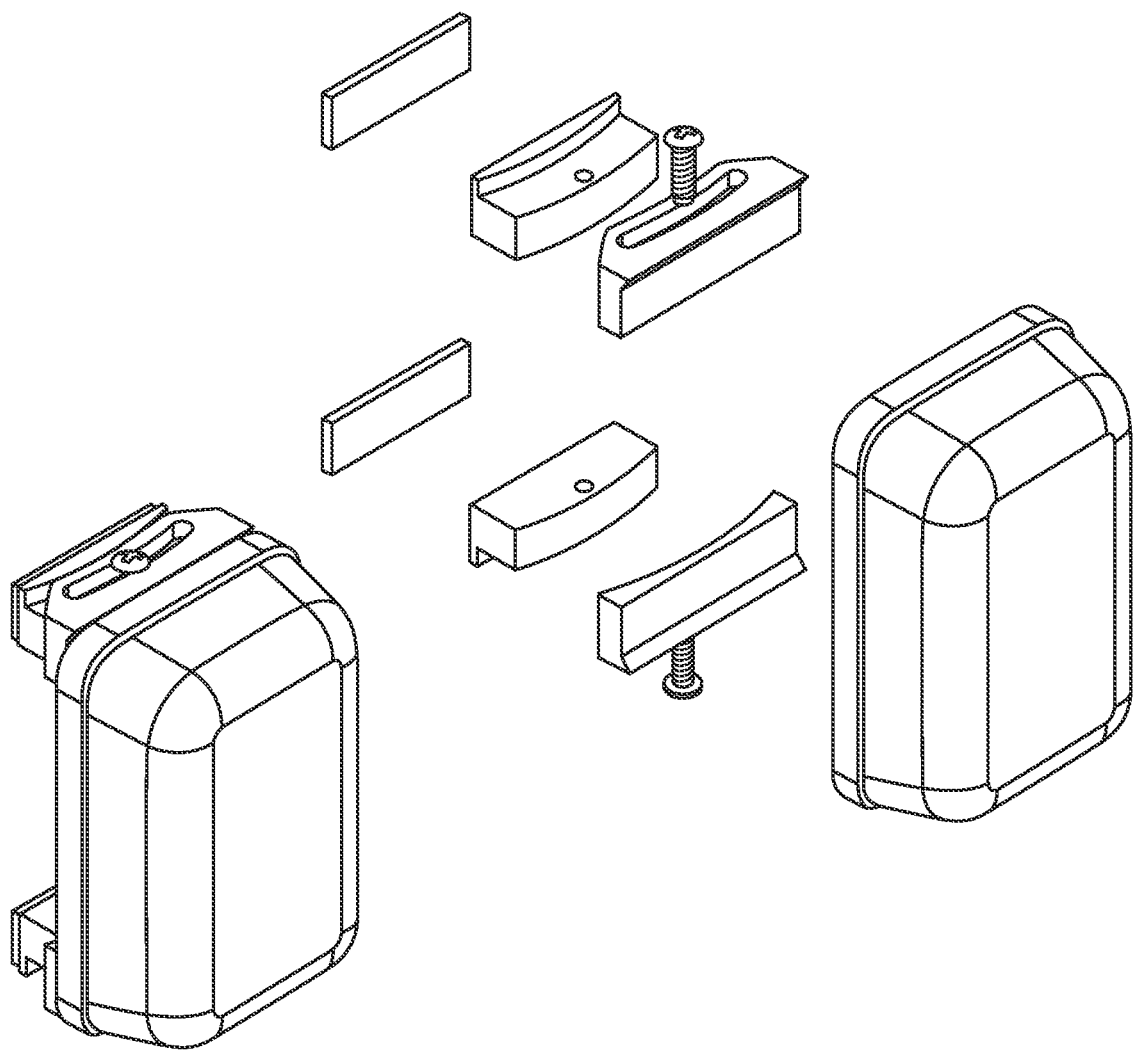
FIG. 10 is a perspective view of a forward-view (e.g., front center) camera/sensing device housing and mounting hardware, assembled and unassembled, according to some embodiments.

In order to detect the presence of an object or pedestrian in front of the vehicle, one or more forward-view cameras/sensors, for example, the forward-view camera/sensor assembly shown in FIG. 10, may be placed in the interior of the bus just below the roof, behind the windshield inside the driver's cabin, on the windshield, and/or on the exterior roof of the driver's cabin near the center of the vehicle. In some embodiments, each of or one or more of the forward-view cameras/sensors may be positioned on the top of the roof outside of the vehicle, inside the vehicle, and/or alternatively, may be provided partially inside the vehicle with the lens portions of the side facing front cameras/sensors positioned just outside of the vehicle or other location, including on the mirror mounting arm or the mirror housing of an exterior mirror, such as that used for the mirror head with visual and/or audio indicator and illumination system. Positioning the lens portion outside of the vehicle can avoid glare generated by the window of the vehicle. On the other hand, providing the camera/sensor entirely inside the vehicle will tend to keep the lens freer of precipitation, dust and urban smog, and will tend to keep the camera/sensor safer from theft, vandalism or the like. Similarly, the forward-view cameras/sensors may be positioned partially inside the vehicle with the lens portions protruding outside of the vehicle, outside of the windshield, outside of the grill of the hood or otherwise. In addition, the forward-view cameras/sensors may be positioned underneath the body of the vehicle since their primary aim may be to view small objects or pedestrians located near the vehicle. In some embodiments, a combination of interior and exterior cameras/sensors is provided with overlapping or redundant coverage to ensure the detection of objects/pedestrians.

In some embodiments, one or more upper visual indicators 160 and/or one or more lower light sources 180 of the mirror head with visual and/or audio indicator and illumination system are triggered responsive to one or more actions or trigger conditions. In some embodiments, the driver of the vehicle is provided a warning device that is activated when the system detects or potentially detects the presence of an object/pedestrian. The warning device includes, for example, visual and/or audio warning devices. Examples of the pedestrian detections and warning systems is described in detail in U.S. Pat. No. 9,908,470, which is also incorporated herein by reference in its entirety.

In some embodiments, one or more upper visual indicators 160 and/or one or more lower light sources 180 of the mirror head are triggered responsive to one or more of detection of objects or pedestrians, when the vehicle is slowing or speeding up, when the vehicle is stopped, when the vehicle is turning, when the detection sensitivity is changed, when the door is opened, when the hazard lights are activated, when the strip side lighting is activated, and the like.

In some embodiments, the mirror head with visual and/or audio indicator and illumination system optionally receives inputs from one or more trigger signal indicators, for example, the shifting of the bus from a park gear to a first gear, the opening or closing of a vehicle door, when the strip side lighting is activated, the turning on or off of an amber or red flashing school bus light to indicate boarding/disembarking, or the like. The system may also optionally receive an input from a manual override, which allows a driver to control the lighting/illumination of the mirror head with visual and/or audio indicator and illumination system, cameras/sensors, monitors, external lighting, audible alerts and external warning devices or the like, for example, with a control console, by opening a vehicle door, or other trigger. An adjustable function timer such as a processor or circuit clock can be adjusted to provide timing signals to any controlled functions that require timing.

In some embodiments, the mirror head with visual and/or audio indicator and illumination system includes functionality to control or be controlled responsive to one or more of control functionality, circuits or processors that optionally provide integrated control over the cameras/sensors, monitors, lighting, audible alerts, and other external warning systems of the vehicle. In some embodiments, a control processor, circuit or function may control the ON/OFF state and operation of any camera/sensor and monitor systems, the ON/OFF state and operation of any vehicle illumination system including the mirror head with visual and/or audio indicator and illumination system, lighting strips and/or floodlights, the ON/OFF state and operation of any audible alert system including any driver alerts and/or any external vehicle alerts for pedestrians and passengers boarding or disembarking from the bus, and the ON/OFF state and operation of any auxiliary driver aids or other external devices, for example, a flashing amber or red bus light, a crossing gate or stop sign mounted from the exterior of the bus, exterior strip lighting, or the like. For example, when the bus door is opened, a processor may receive a trigger signal from a trigger signal indicator, and the processor may then activate a passenger boarding mode, including turning on the red or amber flashing school bus lights, turning on a lighting strip, switching a monitor to display a camera/sensor feed, deploying the crossing gate mounted on the driver's side of the exterior of the bus, turning on an audible alert to inform pedestrians that it is safe to approach the bus or to cross the street, illuminating the LEDs of the mirror head with visual and/or audio indicator and illumination system and/or changing the intensity, color and other characteristics of the LEDs of the illumination system. Similarly, the receipt of a signal indicating the bus door closing may cause the processor or circuit to output an alternate set of instructions or control signals.

In some embodiments, the mirror head with visual and/or audio indicator and illumination system may trigger or receive triggers from other systems such as at least one exterior alarm for the pedestrians corresponding to at least one of the plurality of danger zones when it is determined that a collision between the bus and an objection or person is likely or imminent based on the path of the bus, and the location of the danger zone to avoid the collision with the bus. In some embodiments, the system records the outputs of various mirrors, sensors and/or systems and optionally displays one or more of the outputs on one or more driver displays. In some embodiments, the system records one or more video feeds from one more video capture devices substantially corresponding to detection areas and optionally determines or verifies the operation of one or more systems regarding trigger conditions, collision detection and the like.

In some embodiments, a video switch or other existing or additional electronic or mechanical switch or circuit can be configured to select one or more outputs for display, review or analysis optionally based upon one or more triggering signals. In some embodiments, a triggering signal comprises a backup signal that indicates that the vehicle has been placed in reverse and/or is ready to move in reverse. Any suitable method may be used to obtain such a signal, such as by using the backup lights, a signal from the transmission, drive selector moved to reverse, or the like. A second optional triggering signal comprises a stop-completed signal, indicating that the vehicle has completed a stop and is preparing to move forward in continuance of its journey. Any specific method may be used to obtain such a signal. With specific reference to busses, the stop completed signal can be obtained, for example, from monitoring when the door has been closed; that is, the closing of the passenger door can be interpreted as a stop completed signal, which can be used by the switch. In a school bus, for example, the stop completed signal can be optionally obtained by monitoring the flashing lights that are displayed when a school bus has stopped and/or other shifting of the bus into forward or reverse gear, and the like. In some embodiments, when the flashing lights cease flashing (e.g., are turned off) or the gears have changed or moved from parked to forward or reverse, this event can be interpreted as a stop completed signal. In some embodiments, the mirror head with visual and/or audio indicator and illumination system is triggered responsive to one or more signals generated or actions performed from the above.

In buses, trucks, passenger vans, and the like, and for school buses in particular, an external view of one or more the sides of the vehicle as it pulls away from a stop, as individuals that are in close proximity to a bus when the vehicle pulls away may be inadvertently struck by it. To provide a driver with ample opportunity to review the sides of or around the vehicle for hazard conditions, in one embodiment the video input switch is configured to monitor the stop completed signal and to selected a video feed from an external camera for display for a predetermined amount of time after receiving the stop completed signal, such as for 5 to 15 seconds, more preferably about 10 seconds or other duration. In some embodiments, the selected video feed is from one or more cameras that monitors a side(s), front or rear of the bus. For example, upon receiving, for example, a stop completed signal or a trigger signal, such as when the bus doors close and/or the flashing warning lights are turned off, the video switch selects a side video feed and causes this feed to be presented on a display for a predetermined period of time; alternatively, a split-view scene could be presented on a display formed by a video splitter by a combination of the video feeds from two or more cameras so that both the left and right sides of the bus are presented in a single or multiple side-by-side views. In some embodiments, the mirror head with visual and/or audio indicator and illumination system is triggered responsive to one or more signals generated or actions performed from the above.

Although backup cameras are highly desirable when backing up a vehicle, in some situations, they might not be used in favor of side view and/or rear view mirrors and/or the backup camera may be used in combination with other cameras. Hence, in some embodiments, upon receiving the backup signal, the video switch may temporarily disable the video feed for the backup camera for a predetermined amount of time, such as 30 seconds to two minutes, more preferably for about one minute, and instead require the driver to use the external mirrors instead of relying on a monitor in the interior of the bus. After this predetermined amount of time has elapsed the video, switch may then cause the video feed from the backup camera 3 to be presented in the display, assuming that the bus is still in reverse as indicated by the backup signal or if such as display is manually requested, such as by a switch. In some embodiments, the mirror head with visual and/or audio indicator and illumination system is triggered responsive to one or more signals generated or actions performed from the above.

As shown in FIGS. 8A-8D, one or more holes, receiving areas or receptacles 117 can be opened or formed through the rear facing side 116 of the mirror housing 110. In some embodiments, a speaker 170 and associated circuit board 172 can optionally be installed or mounted to the internal facing side 118 of the mirror housing 110. In some embodiments, the speaker 170 and circuit board 172 are connected electronically with the blind spot detection system and/or a lane change aid system of the vehicle. When the system detects the presence of another vehicle or object in the lane next to the vehicle, or other situations programmed into the system, the speaker 170 can warn the vehicle operator by sending audible warning signals, which can pass through the holes 117, to provide acoustic warning until the system determines that no other vehicle or object, or other situations programmed into the system, is presented in the lane next to the vehicle. In some embodiments, a visual warning system can be employed alone or in conjunction with the audible warning system to alert the driver regarding a possible situation, adjacent object and/or possible collision with an object.

In some embodiments, the acoustic warning from the speaker 170 is performed together with the visual warning from the visual indicator 160 when the system detects the presence of another vehicle or object in the lane next to or in an area near the vehicle, or other situations programmed into the system. In some other embodiments, the acoustic warning from the speaker 170 is performed alone. Yet in some other embodiments, the visual warning from the visual indicator 160 is performed alone. In some embodiments, the system is programmable to enable user customizations regarding when a warning will be issued based on user specified conditions, including closeness to the vehicle, possible closeness to the vehicle, potential collision and the like.

Figure 7A:
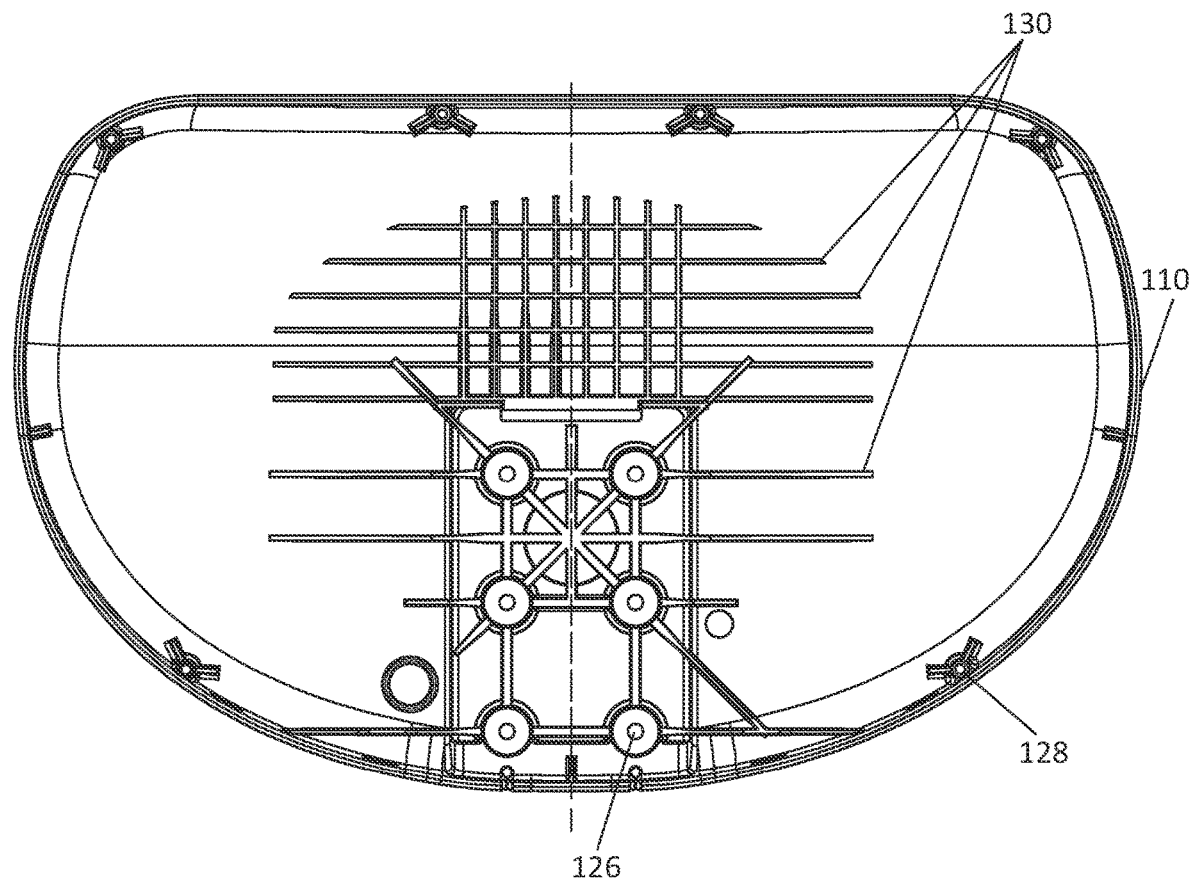
FIG. 7A is an illustration of a mirror housing according to some embodiments of the present inventions.
Figure 7B:
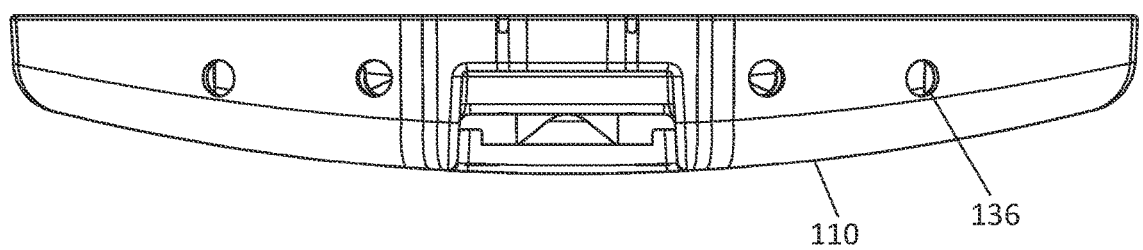
FIG. 7B is a bottom view of the mirror head of FIG. 7A.
Figure 7C:
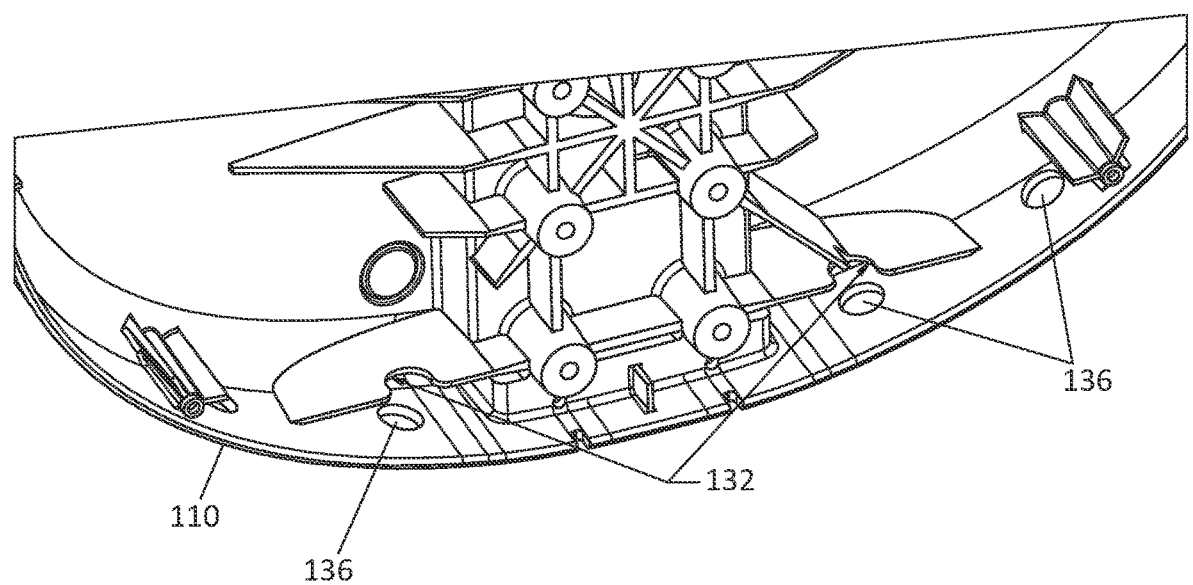
FIG. 7C is a partial perspective view of the mirror head of FIG. 7A.
Figure 8A:
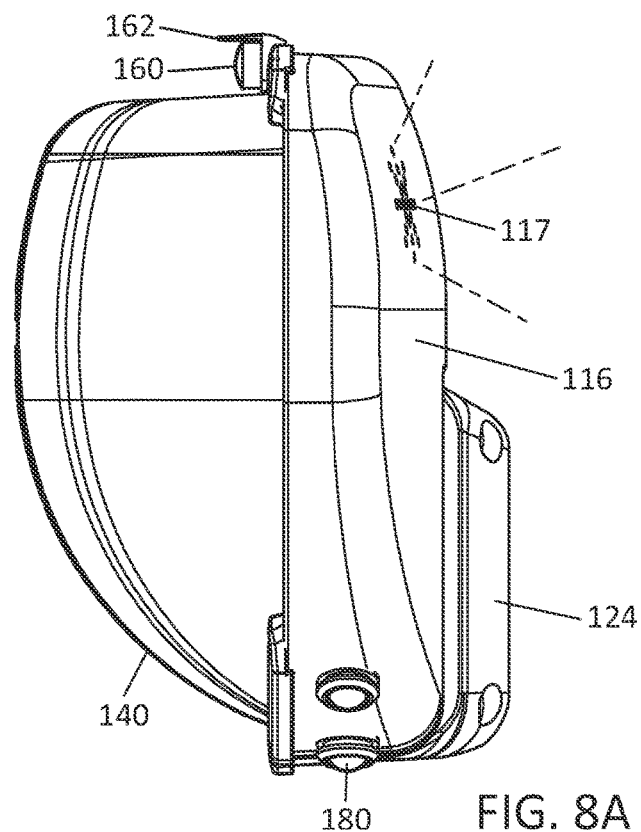
FIG. 8A is a side view of a mirror head according to some embodiments of the present inventions.
Figure 8B:
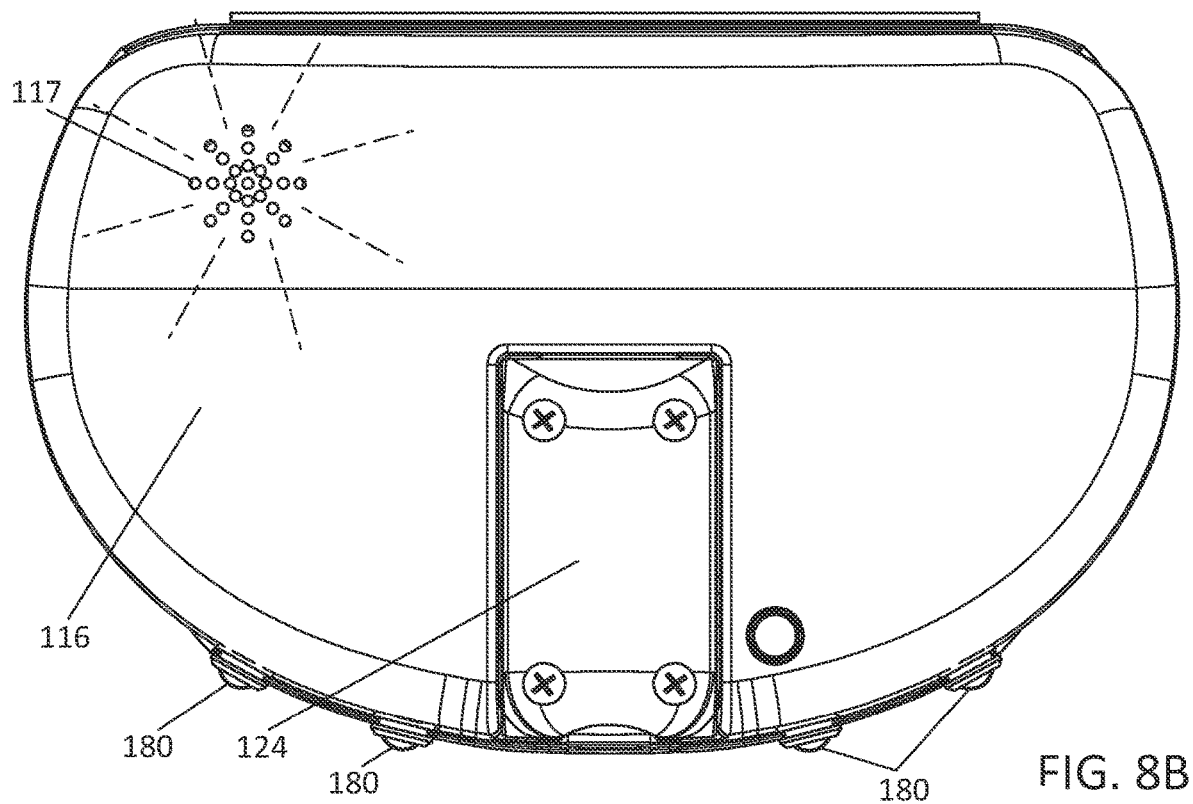
FIG. 8B is a rear view of the mirror head of FIG. 8A.
Figure 8C:
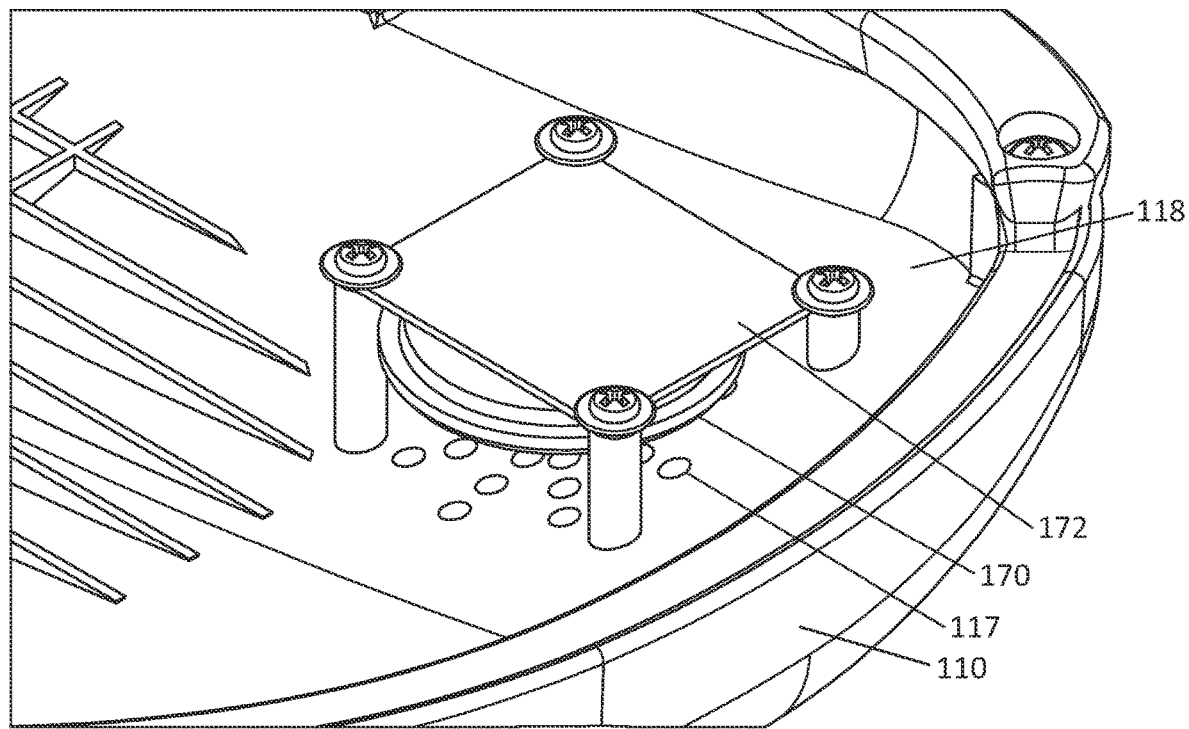
FIG. 8C is an illustration of the mirror head of FIGS. 8A and 8B with the mirror lens being removed to show a circuit board mounted speaker.
Figure 8D:
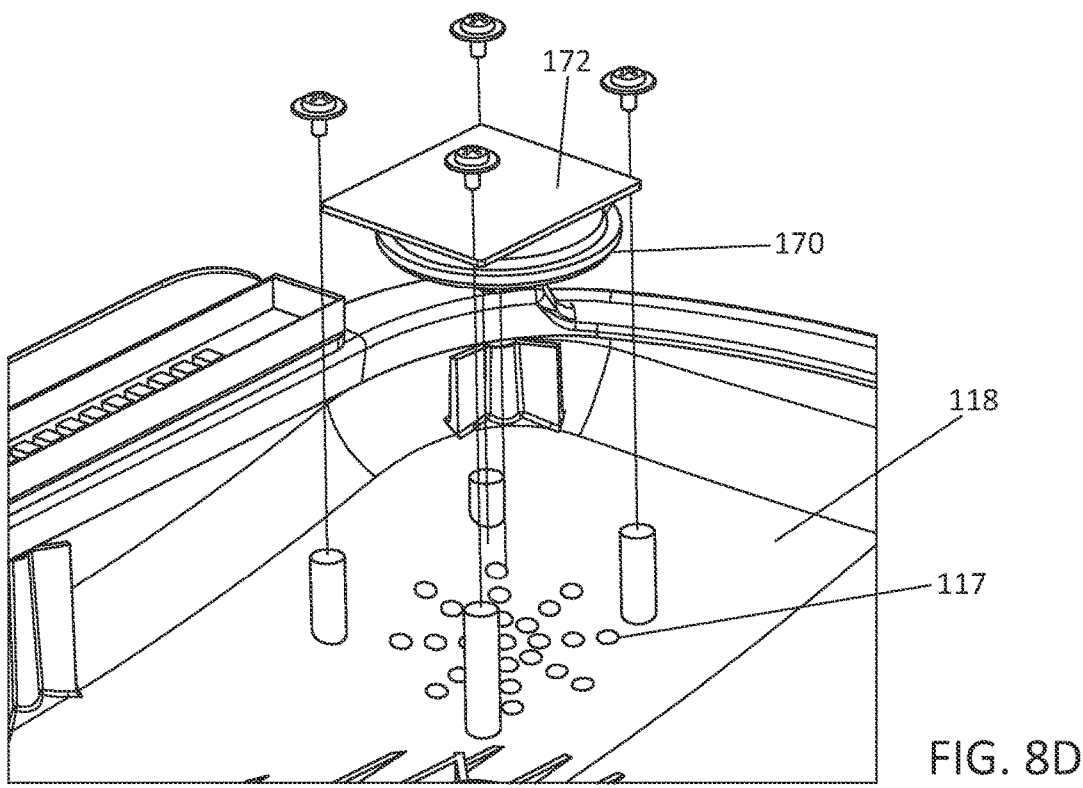
FIG. 8D is an illustration of the mirror head of FIGS. 8A and 8B with the mirror lens being removed to show an exploded view of the circuit board mounted speaker.

Additional illumination can be provided to cast light downwards underneath the mirror head to further light the road surface, for example, for night time danger zone visibility. In some embodiments, one or more light sources 180 can be installed preferably at the bottom side 114 of the housing 110. In some embodiments, the light sources 180 are LED modules. The light sources 180 can be installed to the housing 110 through holes 136 by nut screws. Other standard connection devices can be used instead of and/or in addition to the screws, including bolts, welds, clamps, adhesives and the like. As best shown in FIG. 7C, some support ribs 130 on the internal facing side 118 of the housing 110 can have partial cut outs 132 to accommodate a portion of the light sources 180.

In some embodiments, one or more upper visual indicators 160 and/or one or more lower light sources 180 of the mirror head are activated to primarily to notify the driver that a person or object is within a predetermined area or distance from the vehicle and/or used to illuminated the ground and/or the driver's view to see pedestrians, a detected person and/or object. In some embodiments, one or more upper visual indicators 160 and/or one or more lower light sources 180 of the mirror head are activated based on one or more predetermined trigger conditions that may occur even prior to detection of a pedestrian and/or object. In some embodiments, one or more upper visual indicators 160 and/or one or more lower light sources 180 of the mirror head are activated only when the vehicle is stopped (e.g., a pre-condition to activate the lights to prevent unnecessary use of the lights when the vehicle is in operation). In some embodiments, one or more upper visual indicators 160 and/or one or more lower light sources 180 of the mirror head are activated when the vehicle is stopped, slowing, speeding up and/or turning, and/or once the vehicle is stopped and the additional activation of one or more of opening of the door, side strip lighting, red flashers, vehicle gears placed in park. In other embodiments, the lower light sources are turned on when the vehicle is stopped and/or when the vehicle gears are placed into park. In some embodiments, one or more lower visual indicators can be used instead of, or in addition to, the upper visual indicators 160 and/or one or more upper light sources can be used instead of, or in addition to, the lower light sources 180 of the mirror head. In some embodiments, the visual indicator can be formed of different shapes and mounted to different areas of the housing.

In some embodiments, one or more upper visual indicators 160 and/or one or more lower light sources 180 of the mirror head are triggered responsive to one or more of detection of objects or pedestrians, when the vehicle is slowing or speeding up, when the vehicle is stopped, when the vehicle is turning, when the detection sensitivity as described below in connection with pedestrian or object detection.

In some embodiments, the collision avoidance and/or detection system that can be used in combination with the mirror with visual and/or audio indicator and illumination system provides audible alerts placed near the visual alerts or more strategically near the drivers head to present an increased directional awareness of the location of the danger. Outputs from the system can also be made in the form of seat vibration and/or other forms of awareness such as seat headrest speakers, and the like. In some embodiments, a graphic driver interface is provided in two visible stages: the system has awareness and warning stages. For example, the pedestrian is lit in yellow/amber on a corresponding display for awareness of a pedestrian in range of the danger zone. The system turns to red on the display and warns audibly if it calculates that the pedestrian and bus are on a collision course. This calculation is based on a determination that the speed of the bus and trajectory of the pedestrians movement that the "time to collision" (TTC) is falling within the preset threshold or other criteria indicating that a collision is possible or probable.

In some embodiments, the collision avoidance or detection system and/or method advantageously avoids or minimizes false positives. A false positive is a detection warning when no risk is present. The system parameters are set to be balanced between sensitivity and realism/practical considerations. That is to say, the wider the area of coverage and sensitivity, the greater the sensing during normal driving that will lead to false positives. Driving straight with a side facing camera and/or sensing device can lead to false positives when the cone of coverage is too wide. The system and/or method determines and/or estimates TTC and eliminates/reduces false positives by cutting off the side cameras and/or sensing devices above a preset speed, for example, 12-15 mph based on trajectories that, given the increased speed of straight travel, may become too inclusive and cognizant of pedestrians even 15-20 feet away alongside the bus.

In some embodiments, the collision avoidance or detection system and/or method eliminates/reduces false positives by cutting off the side cameras and/or sensing devices when the vehicle is detected to be moving in excess of a preset speed, and turning on the side camera/sensing device outputs when the vehicle is detected to be in the process (e.g., right before, during and/or right after) a turning activity. This detection can happen based on steering wheel turn sensing, gyroscopic sensing or actual wheel sensors connected to the vehicle electronic bus/wiring system and/or communication multiplex system. The determination of how much turn to use to cut off the side cameras/sensing devices is variable and user selectable. For example, in some embodiments, the side cameras/sensing devices are cut off except when the vehicle is committed to a full turn, e.g., when the driver needs to turn the vehicle more than 10 degrees or other amount to pull into a bus stop. In some embodiments, the system and/or method cuts off the side cameras/devices at or near a bus stop. In some embodiments, once the turn goes past 30 degrees and/or the steering wheel is turned a predetermined amount, the system/method outputs are triggered to activate the side cameras/devices for pedestrian detection and/or alerts. In some embodiments, the system/method outputs directed towards zones that are not in the path of the turn are shut off or their sensitivity reduced to avoid triggering alarms where collisions are unlikely. In some embodiments, the system and/or method remains active and the side cameras/sensing devices continue to collect and store data, but the processors ignore the data collection for the determination of a potential collision when the side cameras/sensing devices are cut off. That is, in some embodiments, the data from the side cameras/sensing devices are merely ignored for a predetermined time period determined by when the potential for false positives is unacceptably high as programmed by the user or preset by the system/method.

In some embodiments, the collision avoidance or detection system outputs including activation or trigger signals are responsive to, or change in response to the speed or acceleration of the turning bus and/or the detection of a changing turn, such as a first or higher order derivative of the turning angle with respect to time. For example, side cameras/sensing devices may turn on or increase their sensitivity in response to a sharp turn and/or an increasing turning speed, and vice versa.

In some embodiments, cameras and/or sensors with predetermined fields of view, such as 25-45 degrees of view, are used, and multiple cameras/sensors may be utilized and their images/sensor data may be stitched together or used in combination to form a composite field of view and/or composite sensor reading for use in detecting pedestrians and/or other objects. In some embodiments, the field of view is substantially 25-65 degrees, defined by an approximate 10% degree variation. In some embodiments, the field of view is about 35-45 degrees, defined by an approximate 2-5% degree variation. For example, in some embodiments, a camera/sensor layout configured to detect risks and/or pedestrians specific to buses making left and right turns includes three front view cameras/sensors and side-mounted cameras/sensors. These three front view cameras/sensors include a center camera/sensor facing forward and two cameras/sensors, each facing in a front/side angular direction capturing both front and respective side views for each side of the vehicle. Each front/side facing front camera/sensor is aimed across the hood of the bus, and provides awareness of pedestrians in a crosswalk as the bus enters an intersection from a frontal and side perspective. Additional side-mounted cameras/sensors are optionally mounted near the rear of the bus, face forward, and have fields of view that run along the side of the bus, including the area immediately next to the bus and forward therefrom. Any or all of the cameras/sensors may be positioned with a vertical angular orientation and directed toward the desired target area. Various camera/sensor orientations, locations and/or angles may be used.

The collision avoidance or detection system is optionally configured to provide alarms, visual, audible or otherwise, when a pedestrian is in a particular danger zone and when the bus is at risk of colliding with a pedestrian. The system therefore includes a driver interface that may include alarms corresponding to the locations of any at-risk pedestrians.

To avoid false positives, in some embodiments, certain cameras/sensing devices are disengaged or certain alarms or system outputs are deactivated. For example, when the bus is in transit and traveling straight ahead, there is little risk that a pedestrian will impact the side of the bus. Accordingly, in some embodiments, the-side mounted cameras/sensing devices may be desensitized or disengaged, and/or their alarms deactivated, except when a turn is detected. For example, a turn may be detected using steering wheel turn sensing, gyroscopic sensing or wheel sensors. The engagement/disengagement, adjustment of sensitivity and/or adjustment of fields of views, as well as other changes and/or detections for the collision avoidance or detection system can all be used as triggers to generate signals to the collision avoidance and/or detection system that can be used in combination with the mirror with visual and/or audio indicator and illumination system.

Figure 9A:
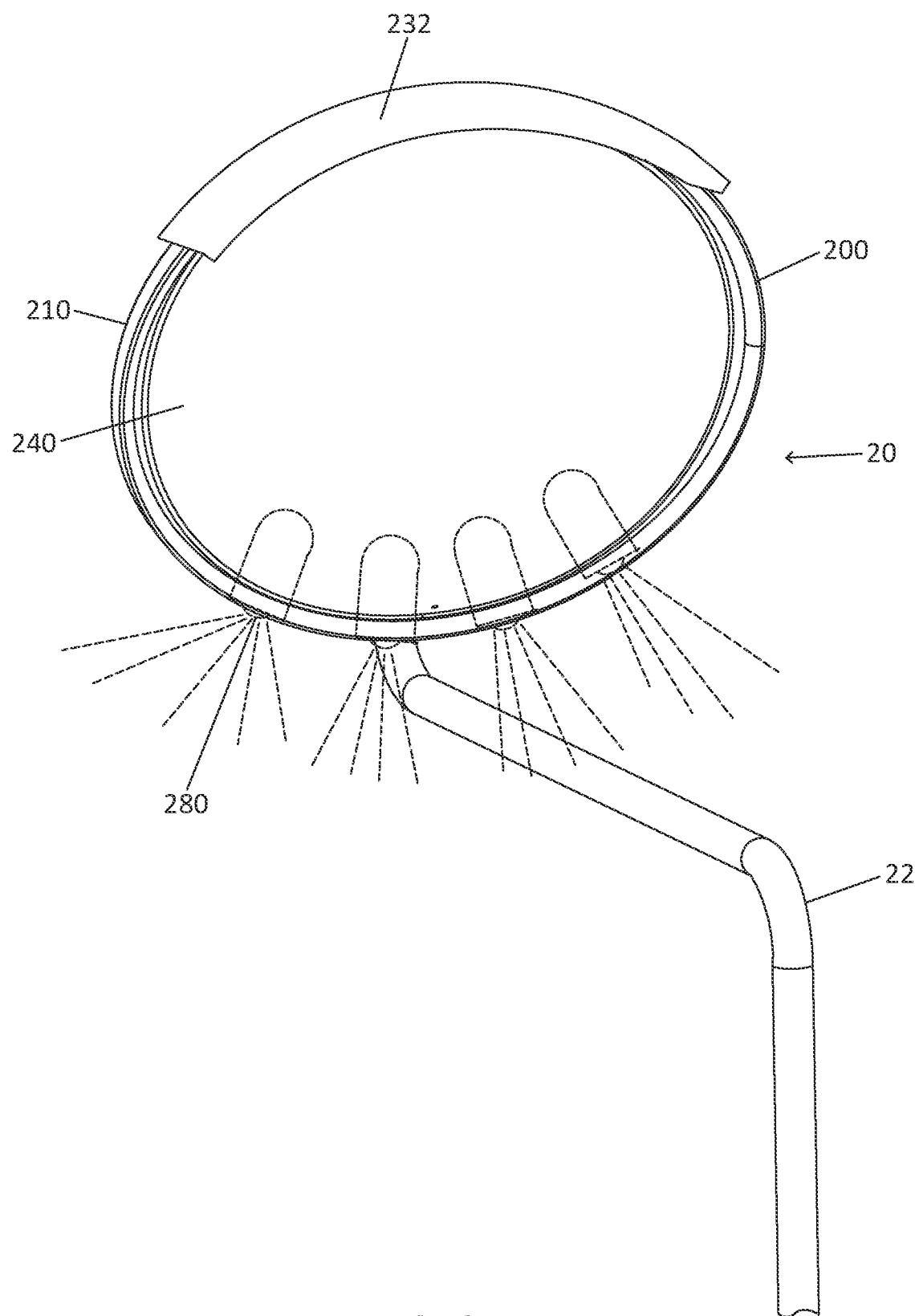
FIG. 9A is a front perspective view of a vehicle mirror assembly showing a mirror head mounted on a mirror mounting arm according to some embodiments of the present inventions.
Figure 9B:
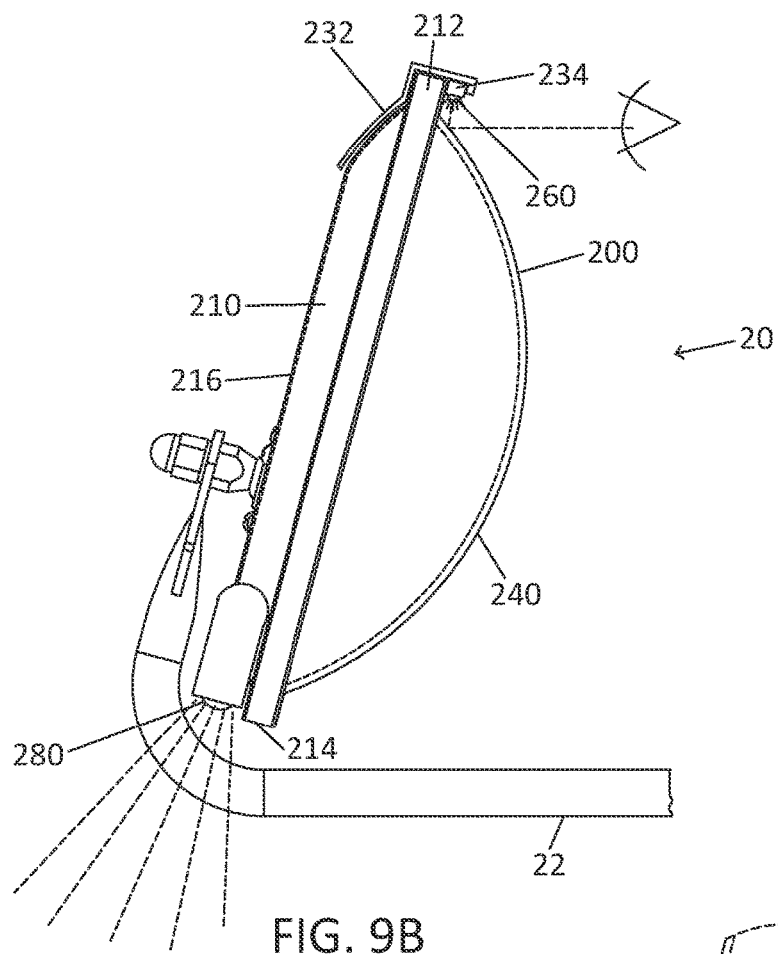
FIG. 9B is a cross-sectional view of the vehicle mirror assembly of FIG. 9A. A warning light module can emits light, which is reflected by the mirror lens, to warn the driver. A lamp module can emits lights to illuminate area under the mirror to improve visibility.
Figure 9C:
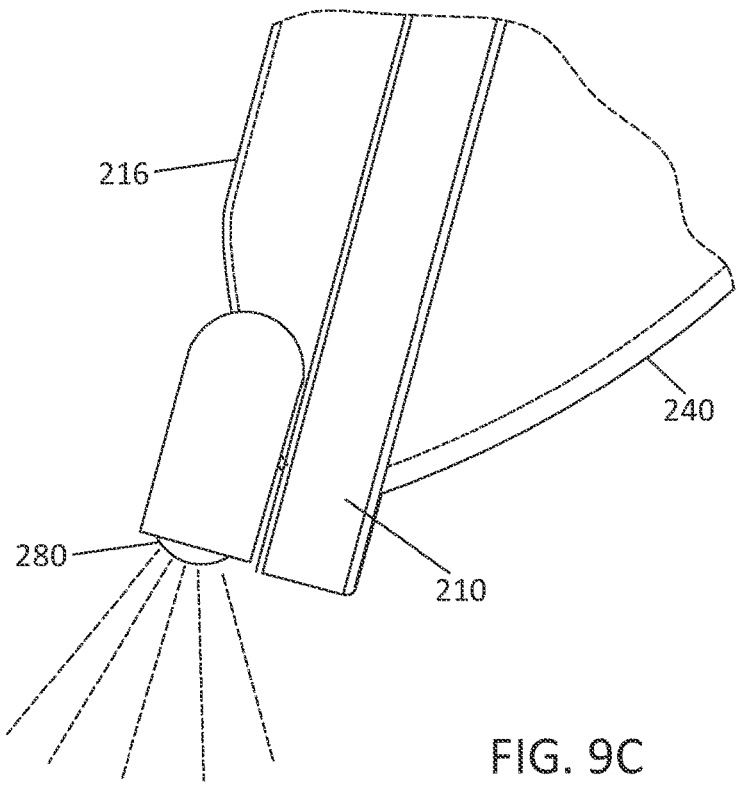
FIG. 9C is a partial enlarged view of FIG. 9B.

FIG. 9A is a front perspective view of another vehicle mirror assembly 20 showing a mirror head 200 mounted on a mirror mounting arm 22 according to some embodiments of the present inventions. FIG. 9B is a cross-sectional view of the vehicle mirror assembly 20 of FIG. 9A. FIG. 9C is a partial enlarged view of FIG. 9B.

As shown in FIGS. 9A-9C, the vehicle mirror assembly 20 includes a mirror head 200 and a mirror mounting arm 22. The mirror head 200 mainly includes a mirror housing 210 and a mirror lens 240. The mirror housing 210 includes a top side 212 and an opposing bottom side 214 and a rear facing side 216. As shown in FIG. 9B, the tubular mirror mounting arm 22 is provided with coined end 24 with a mounting hole for a ball stud type mounting. When the ball stud mount is used, a ball stud can be placed in the spherical socket. The mirror lens 240 has a perimeter that is sized to fit and secured within the mirror housing 210 by, for example, screws or other connectors.

A shield 232 can be provided at or near the top side 212 of the mirror housing 210 in some embodiments. The shield 232 preferably can be provided with an inward facing channel 234 for housing a visual indicator 260. This visual indicator 260 is connected electronically with the blind spot detection system and/or a lane change aid system built to the vehicle. The visual indicator 260 can include one or more LEDs. When the system detects the presence of another vehicle or object in the lane next to the vehicle, or other situations programmed into the system, the visual indicator 260 can warn the vehicle operator by sending light signals, for example flashing a light or beacon, until the system determines that no other vehicle or object, or other situations programmed into the system, is presented in the lane next to the vehicle. As shown in FIG. 9B, the lighting of the visual indicator 260 is reflected by a portion the mirror lens 240 near the top rim to warn the vehicle operator. The shield 232 can provide shielding to the light emitted from the visual indicator 260 from sun glare. In the configuration described above, lighting of the visual indicator 260 will not block any main portion of the rear view reflected by the mirror. As a result, useful mirror surface area will advantageously not be reduced while the visual indicator 260 is providing warning to the vehicle operator.

In some embodiments, one or more receptacles or holes (not shown) are optionally configured through the rear facing side 216 of the mirror housing 210 to allow audible warning signals passing from a speaker built inside the housing. The speaker is connected electronically with the blind spot detection system and/or a lane change aid system of the vehicle. When the system detects the presence of another vehicle or object in the lane next to the vehicle, or other situations programmed into the system, the speaker can warn the vehicle operator by sending audible warning signals, which can pass through the holes, to provide acoustic warning until the system determines that no other vehicle or object, or other situations programmed into the system, is presented in the lane next to the vehicle. In some embodiments, the acoustic warning from the speaker is performed together with the visual warning from the visual indicator when the system detects the presence of another vehicle or object in the lane next to the vehicle, or other situations programmed into the system. In some other embodiments, the acoustic warning from the speaker is performed alone. Yet in some other embodiments, the visual warning from the visual indicator is performed alone.

Additional illumination can be provided to cast light downwards underneath the mirror head to further light the road surface, for example, for night time danger zone visibility. In some embodiments, one or more light sources 280 can be installed preferably at the rear facing side 216, and also near the bottom side 214, of the housing 210. In some embodiments, the light sources 280 are LED modules.

FIGS. 12A-17 illustrate yet another exemplary vehicle mirror assembly 30 of the present inventions. The vehicle mirror assembly depicted in FIGS. 12A-17 is similar to that of FIGS. 1-8B except for some variations described hereafter. Accordingly, features in FIGS. 12A-17 that share the same lower two digits of the three-digit drawing reference numbers have similar features as their counterparts in FIGS. 1-8B and will not be repeatedly described.

Referring to FIGS. 12A-17, the vehicle mirror assembly 30 includes a mirror head 300 and a tubular mirror mounting arm 12.

A visual indicator 360 is advantageously mounted at or on the top side 352 of the lens retaining rim 350. The visual indicator 360 can be attached or mounted to a visual indicator mounting base 362, which in turn is attached or mounted to the lens retaining rim 350. In some embodiments, the visual indicator 360 has screw holes 366 (best shown in FIG. 15B) that allow the visual indicator 360 to be mounted to the visual indicator mounting base by screws 362. A cable 368 (best shown in FIGS. 15A and 15C) can be provided for supplying power and/or sending control signals to the visual indicator 360.

The visual indicator 360 can include one or more light emitting diodes (LEDs). When the system detects the presence of another vehicle or object in the lane next to the vehicle, or other situations programmed into the system, the visual indicator 360 can warn the vehicle operator by sending light signals, for example flashing or beacon, until the system determines that no other vehicle or object, or other situations programmed into the system, is presented in the lane next, near to, or in front of the vehicle. In the configuration described above, the lighting of the visual indicator 360 will advantageously not block or obstruct any portion or significant portion of the rear view reflected by the mirror. As a result, useful mirror surface area will not be reduced or maximized while the visual indicator 360 is providing warning to the vehicle operator. In other embodiments, two or more different types of illumination may be provided depending on the detection and/or exterior conditions, such as weather, time of day, environment and the like. For example, if the time of day is late, the illumination system might be activated at a low lighting level either continuously or responsive to certain trigger conditions described below. However, the illumination system can optionally include a different lighting pattern, strobe emission, ambience and/or color of light should the presence of a pedestrian or other dangerous condition be detected, as described below.

Figure 13:
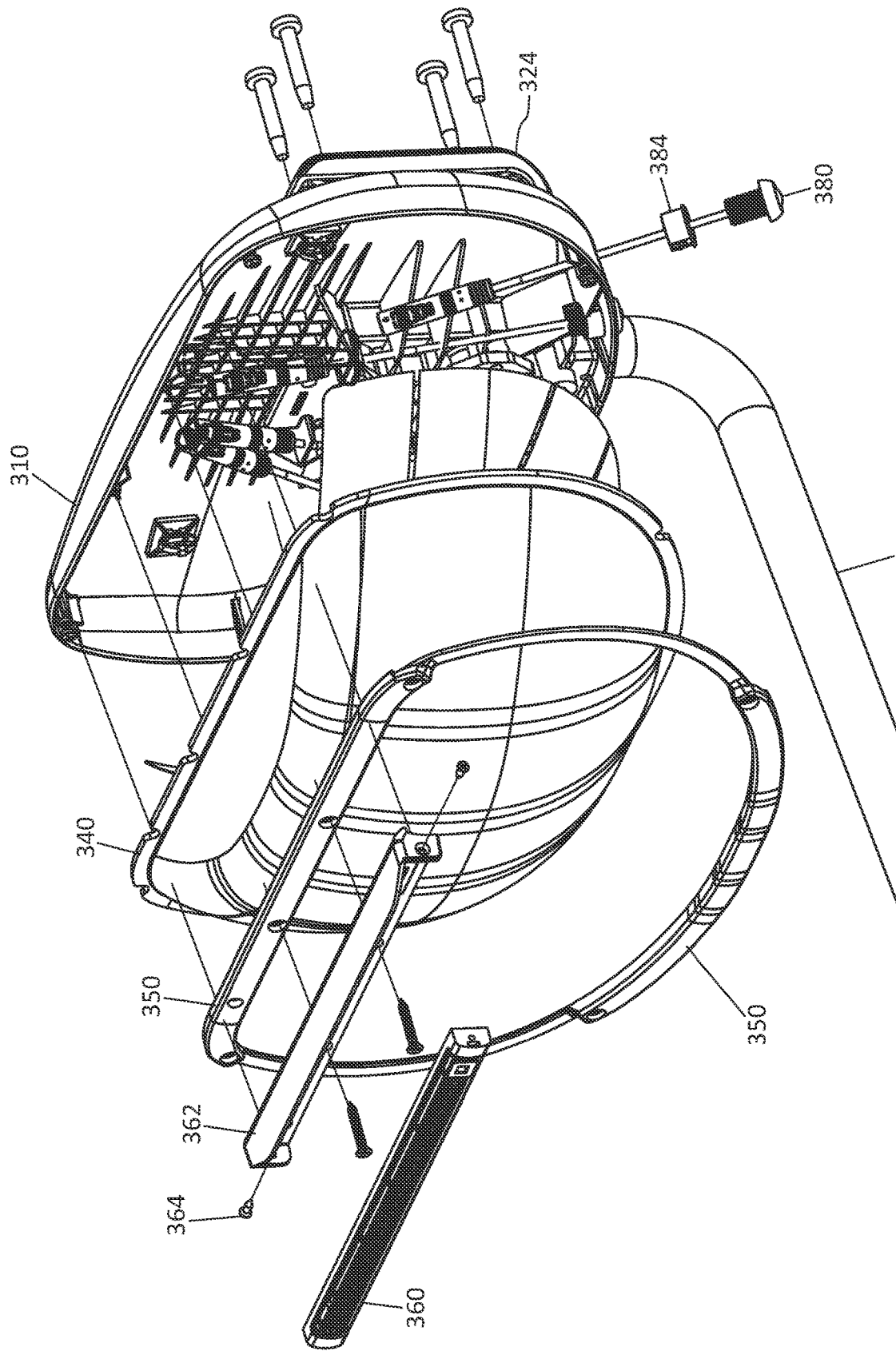
FIG. 13 is an exploded view of the vehicle mirror assembly of FIG. 12A showing the assembly components.
Figure 14A:
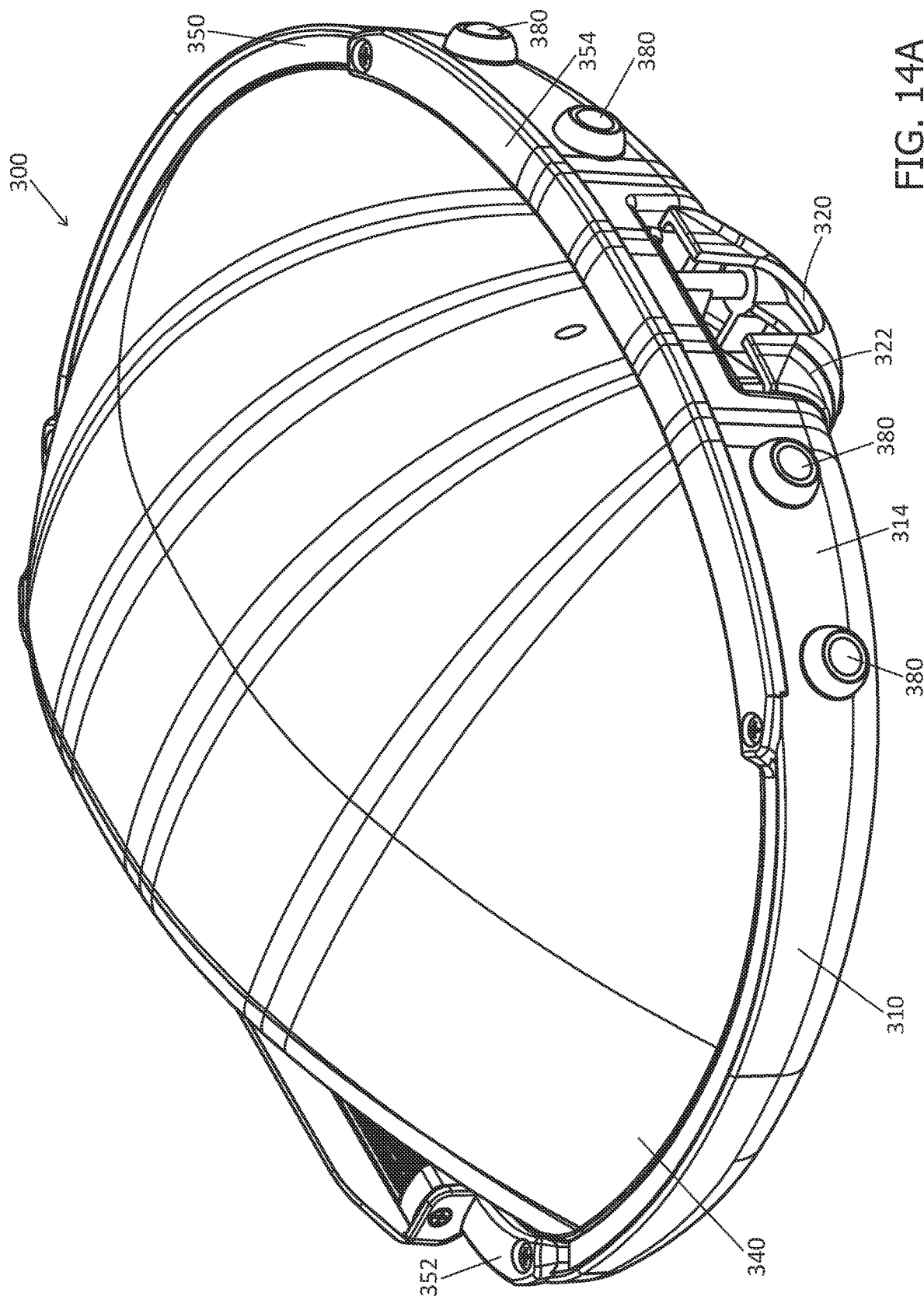
FIG. 14A is another perspective view of the mirror head of FIG. 12A with the mirror mounting arm being removed.
Figure 14B:
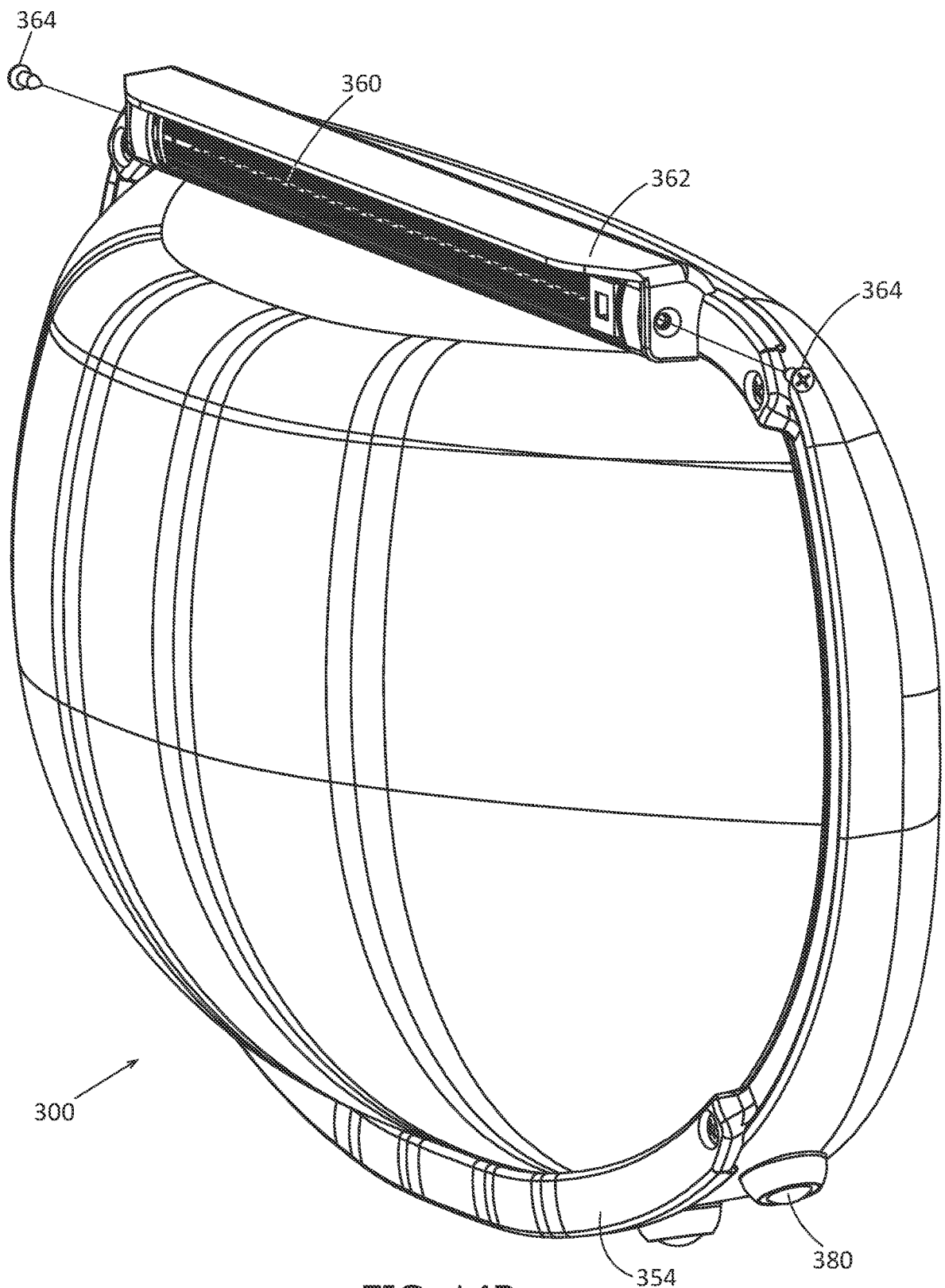
FIG. 14B is another perspective view of the mirror head of FIG. 12A with the mirror mounting arm being removed.
Figure 15A:
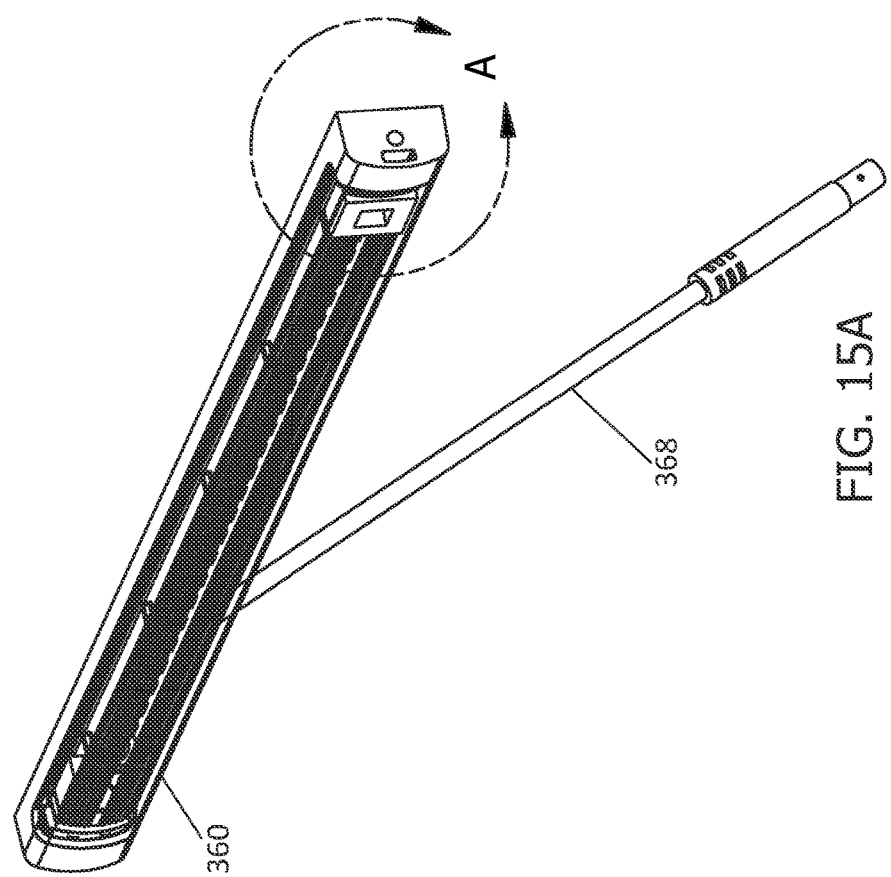
FIG. 15A is a perspective view of the visual indicator of FIG. 12A.
Figure 15B:
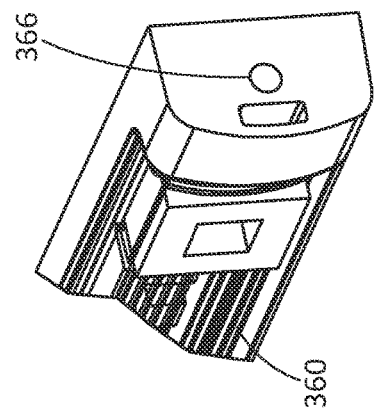
FIG. 15B is an enlarged view of the circled portion of the visual indicator of FIG. 15A.
Figure 15C:
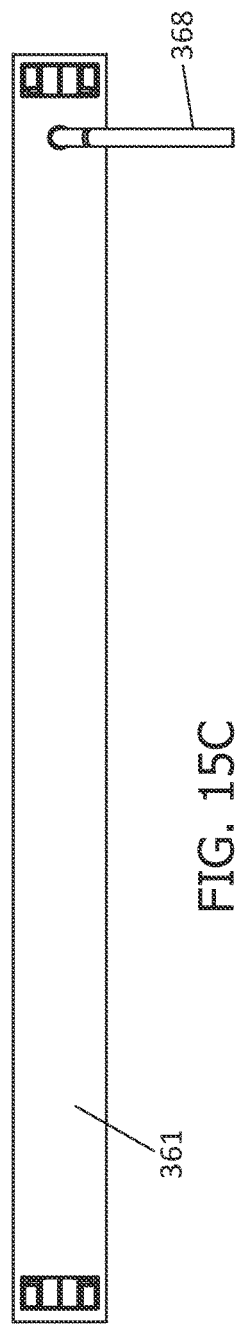
FIG. 15C is a rear view of the visual indicator of FIG. 15A.
Figure 16:
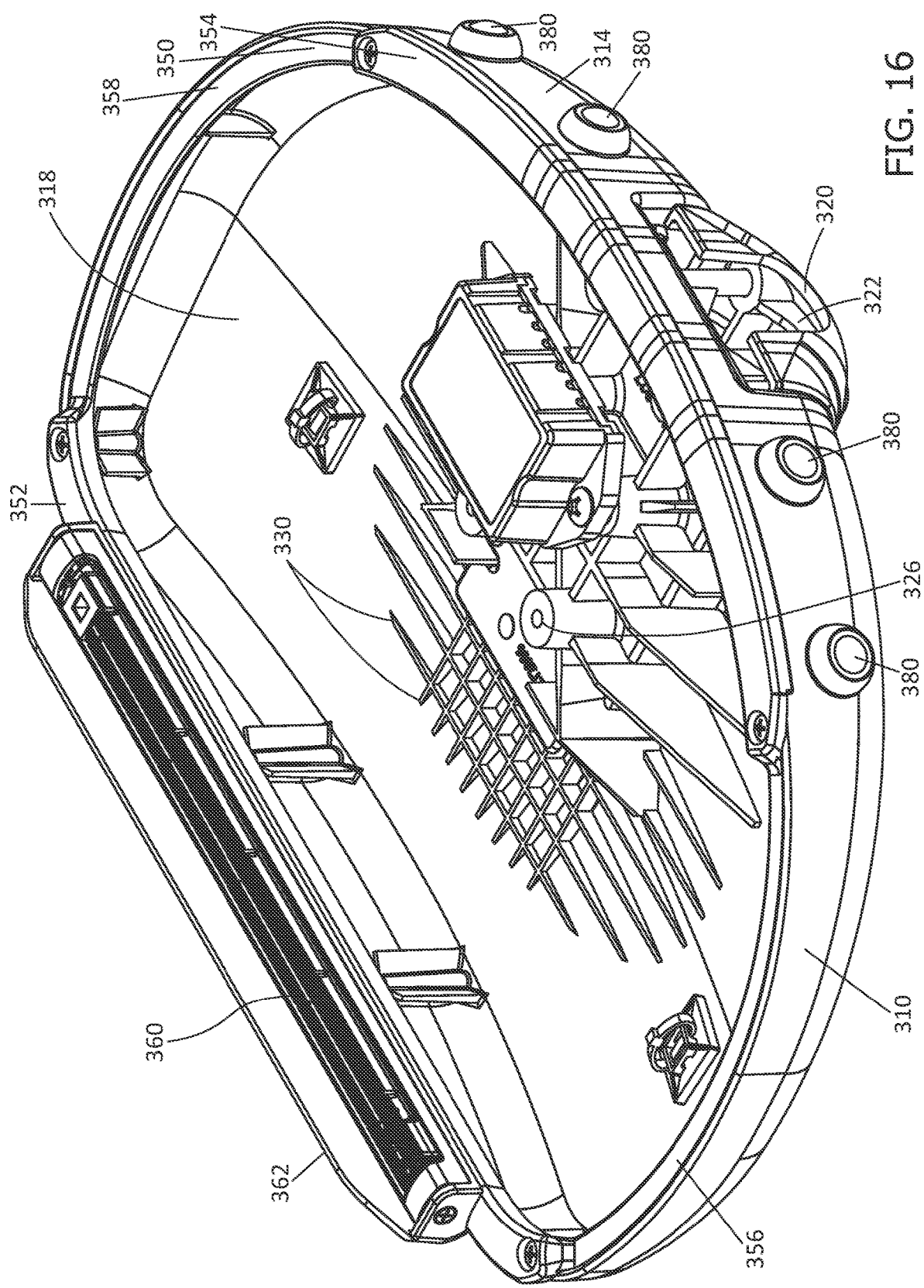
FIG. 16 is an illustration of the mirror head of FIG. 14A with the mirror lens being removed to show the interior side of the mirror head.
Figure 17:
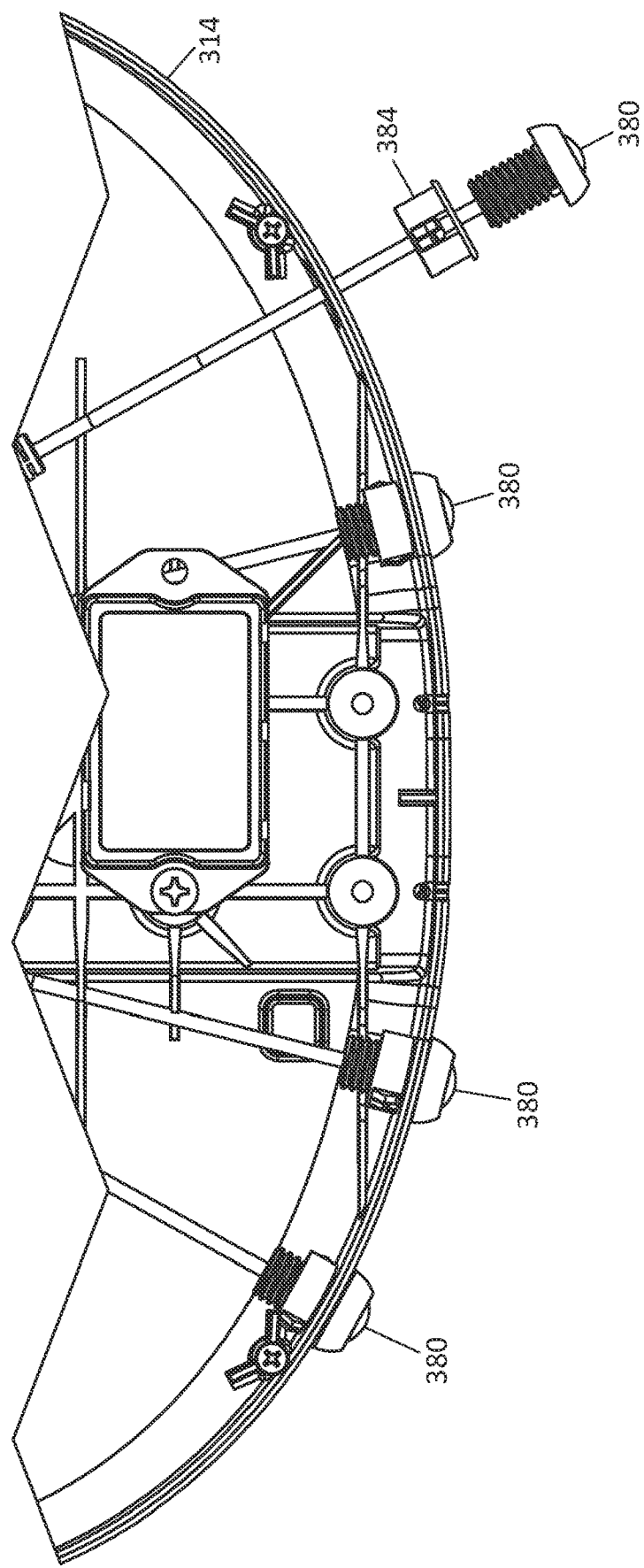
FIG. 17 is a partial enlarged front view of FIG. 16.

Additional illumination can be provided to cast light downwards underneath the mirror head to further light the road surface, for example, for night time danger zone visibility. In some embodiments, one or more light sources 380 can be installed preferably at the bottom side 314 of the housing 310. In some embodiments, the light sources 380 are LED modules. As best shown in FIGS. 13 and 17, the light sources 380 are installed to the housing 310 with plastic snap bushings 384 to allow for quick installation. In addition, the plastic snap bushings 384 allow easy removal of the light sources 380 for replacement.

FIGS. 1A-9C and 12A-17 depict exemplary vehicle mirror assemblies 10, 20 according to some embodiments of the present invention. Different shaped and/or sized components and parts may optionally be used. In addition, the specific installation procedures may be revised, ordered differently and additional procedures added/removed, to achieve the overall installation of a stable vehicle mirror assembly in accordance with some embodiments.

In some embodiments, the vehicle mirror assemblies 10, 20, 30 are configured to be mounted on the driver side of the vehicle. In some embodiments, the vehicle mirror assemblies 10, 20, 30 are configured to be mounted on the passenger side of the vehicle. In some embodiments, the mirror head 100, 200, 300 can be mounted to different mirror mounting assembly, for example, the mirror mounting assembly described in U.S. application Ser. No. 15/088,623, filed Apr. 1, 2016, and U.S. application Ser. No. 16/012,625, filed Jun. 19, 2018, which are incorporated herein by reference. In some embodiments, one or more lower visual indicators can be used instead of, or in addition to, the upper visual indicators 160, 360 and/or one or more upper light sources can be used instead of, or in addition to, the lower light sources 180, 380 of the mirror head.

The vehicle mirror assemblies 10, 20, 30 may optionally be mounted on various types of vehicles including but not limited to commercial, industrial, or passenger vehicles.

Figure 11:
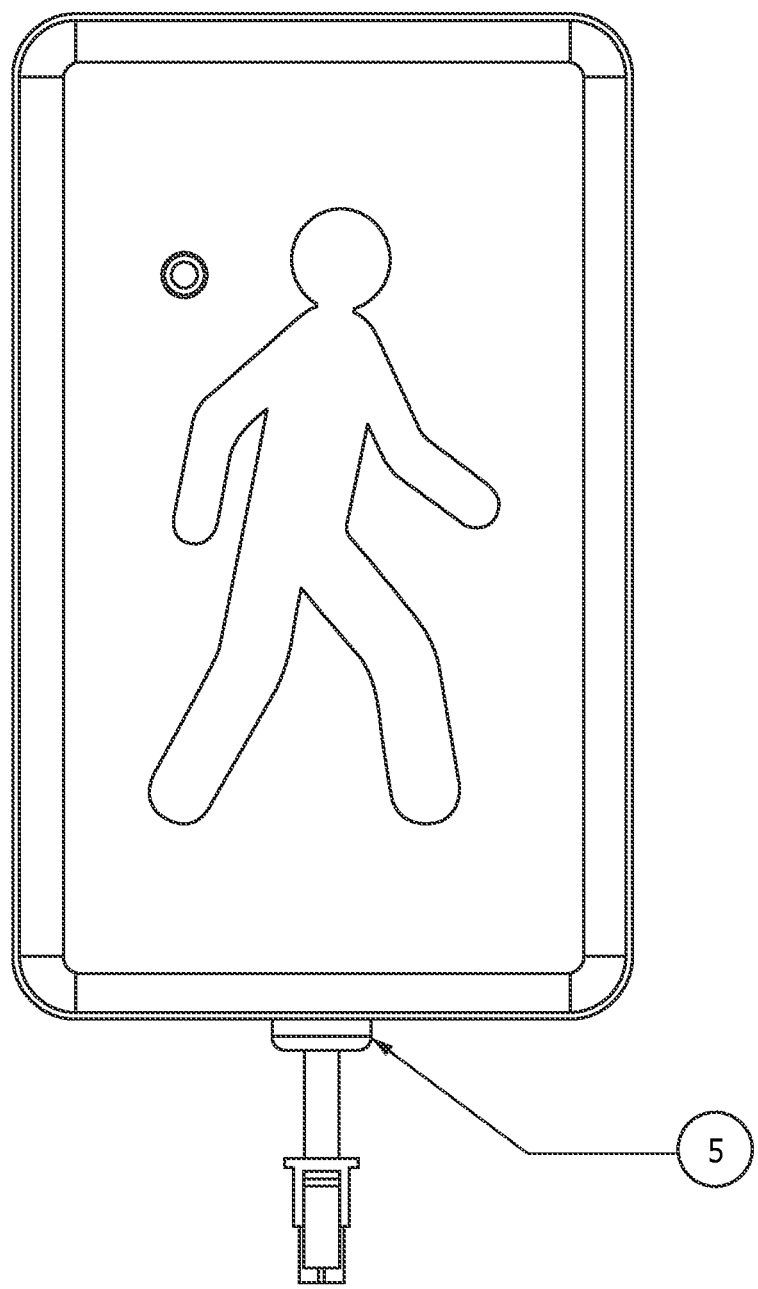
FIG. 11 is a front view of an alternative visual indicator according to some embodiments.
Figure 12A:
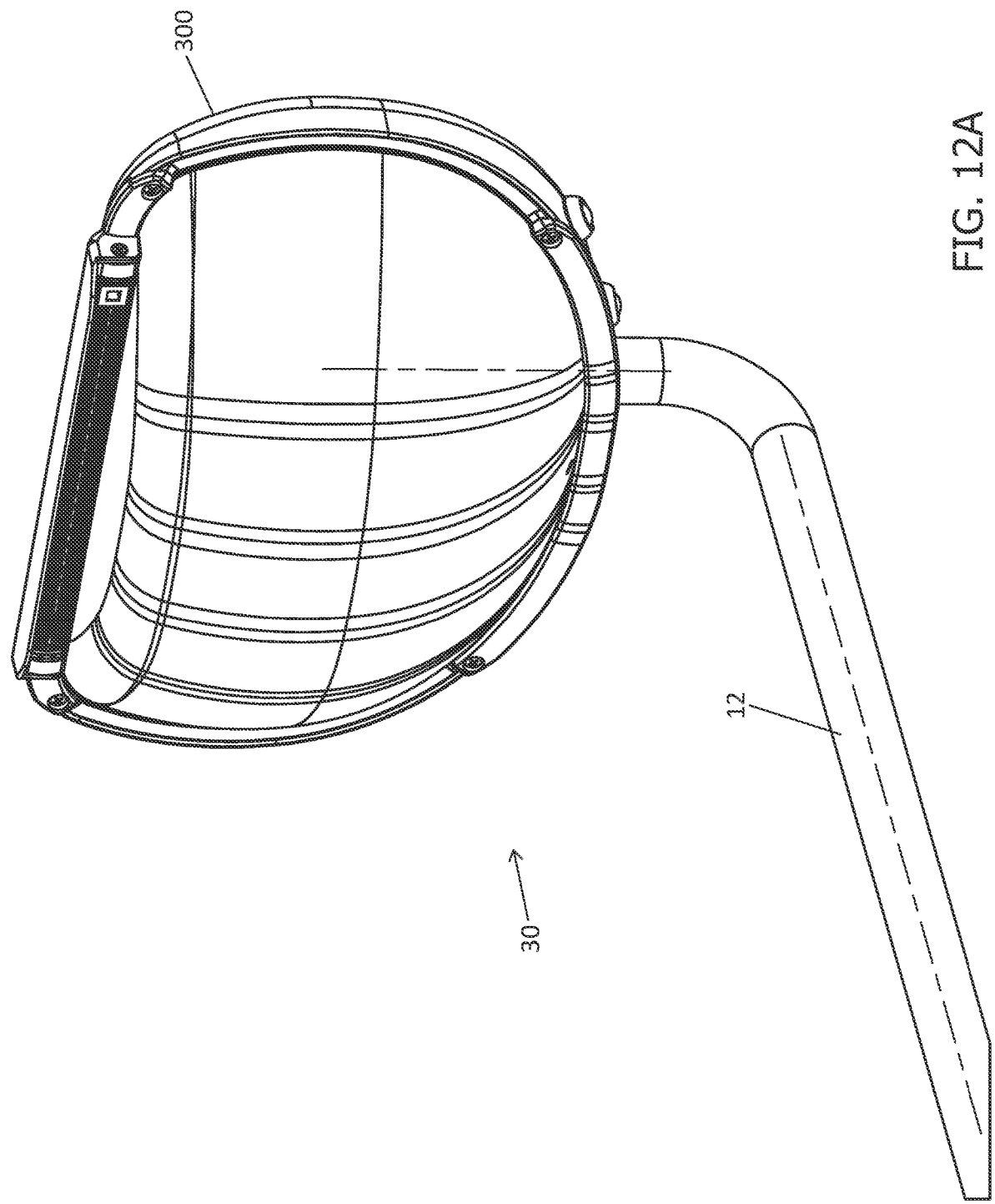
FIG. 12A is a front perspective view of a vehicle mirror assembly showing a mirror head mounted on a mirror mounting arm according to some embodiments of the present inventions.
Figure 12B:
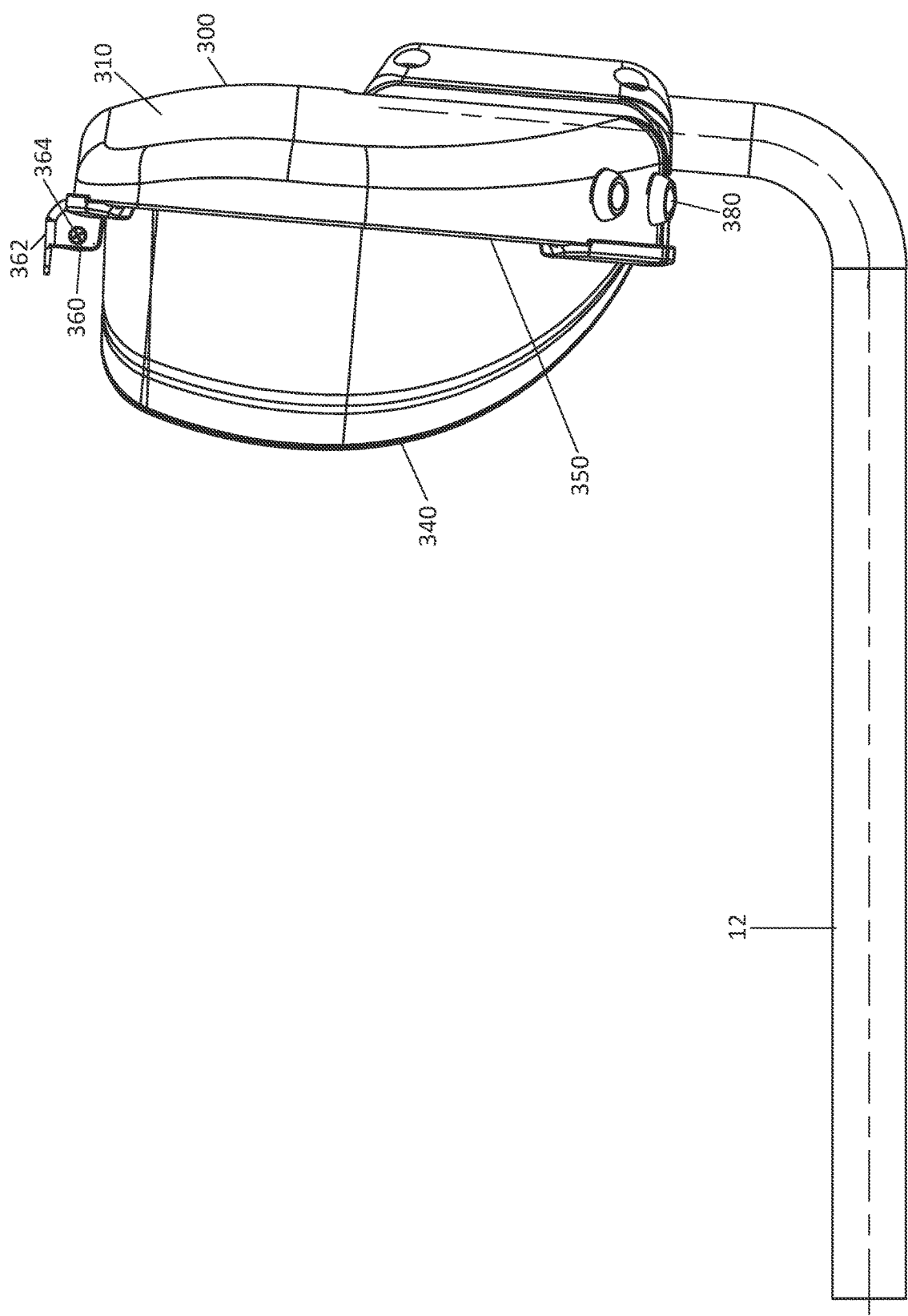
FIG. 12B is a side view of the vehicle mirror assembly of FIG. 12A.
Figure 12C:
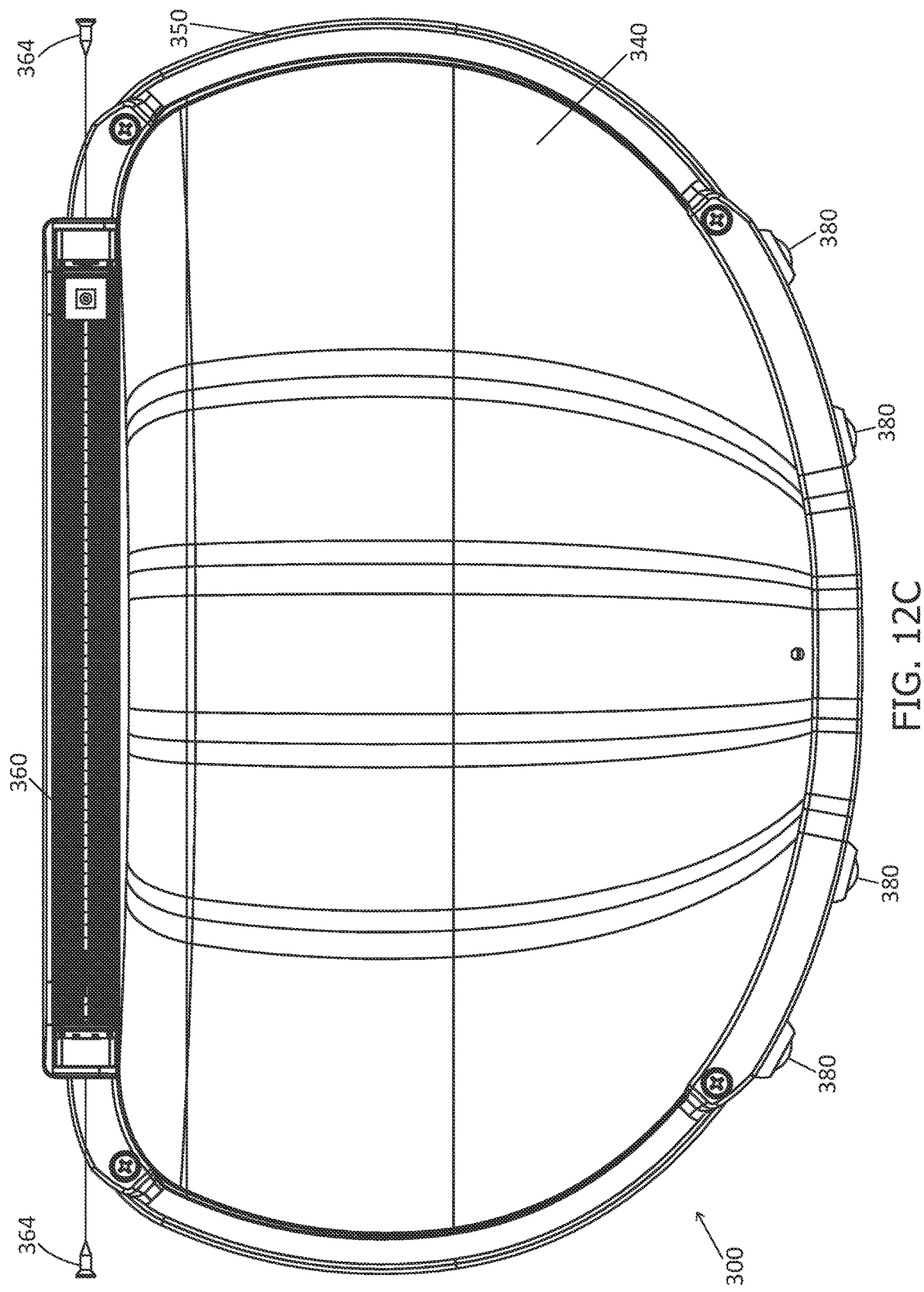
FIG. 12C is a front view of the vehicle mirror assembly of FIG. 12A with the mirror mounting arm being removed.

FIG. 11 shows an alternative visual indicator according to some embodiments. The visual indicator shown in FIG. 11 can be an LED backlit pedestrian graphic indicator. A piezoelectric alarm can be optionally included. The visual indicator shown in FIG. 11 can be used as an addition or supplement to the visual indicator 160, 260, 360 described herein. In one embodiment, more than one visual indicator shown in FIG. 11 are used. The visual indicator shown in FIG. 11 can be mounted at locations that are easy to see by the vehicle operator, for example, in front of the vehicle operator, at the front-left side of the vehicle operator and/or at the front-right side of the vehicle operator.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein is not to be considered implying a specific sequence of steps to perform the above described process. Other alterations or modifications of the above processes are also contemplated. For example, further insubstantial approximations of the above equations are also considered within the scope of the processes described herein.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cross view mirror for a vehicle, comprising:
 a housing having a rear side and a front side opposing to the rear side;
 a retaining rim positioned on the front side of the housing having a top side and a bottom side opposing to the top side;
 a convex mirror lens secured between the housing and the retaining rim with said retaining rim configured to be positioned around the outside peripheral surface of the convex mirror lens; and
 a visual indicator comprising a light emitting diode device that extends along the top side of the retaining rim for providing light signals to warn an operator driving the vehicle when an object or person is detected in a lane next to or in front of a vehicle, wherein the visual indicator is mounted to a visual indicator mount which in turn is attached to at least one of the retaining rim or the housing.

2. The cross view mirror for a vehicle according to claim 1, wherein the visual indicator is mounted by screws.

3. A cross view mirror for a vehicle according to claim 1, wherein said visual indicator is mounted to an upper area of said housing.

4. A cross view mirror for a vehicle according to claim 1, and wherein said cross view mirror further comprises a plurality of light sources mounted to or disposed within a lower area of said housing emitting light to illuminate areas or ground near the vehicle to enable a driver to visually determine a presence of a person or object.

5. The cross view mirror for a vehicle according to claim 4, wherein the plurality of light sources is secured by plastic snap bushings.

6. A cross view mirror for a vehicle according to claim 4, wherein said plurality of light sources are activated independent of the presence of the person or the object.

7. A cross view mirror for a vehicle according to claim 4, wherein said plurality of light sources are activated responsive to at least one vehicle operation or operating characteristic prior to detection of the presence of the person or the object.

8. A cross view mirror for a vehicle according to claim 4, further comprising an activation device configured to activate said plurality of light sources to provide the light signals responsive to one or more activation or triggering signals.

9. A cross view mirror for a vehicle according to claim 8, wherein one of the one or more activation or triggering signals comprises one or more of a backup signal, a stop-completed signal, an opening of a door signal, hazard light activation signal, vehicle gear in park signal or exterior side strip signal.

10. A cross view mirror for a vehicle according to claim 4, further comprising an activation device configured to activate said plurality of light sources to provide the light signals responsive to one or more activation or triggering signals after a predetermined vehicle operation or vehicle operating characteristic.

11. A cross view mirror for a vehicle according to claim 10, wherein the predetermined vehicle operation or vehicle operating characteristic comprises the vehicle in a stopped state or the vehicle parking gear in park.

12. A cross view mirror for a vehicle according to claim 1, further comprising an activation device configured to activate said visual indicator to provide the light signals responsive to one or more activation or triggering signals.

13. A cross view mirror for a vehicle according to claim 12, wherein one of the one or more activation or triggering signals comprises a backup signal.

14. A cross view mirror for a vehicle according to claim 12, wherein one of the one or more activation or triggering signals comprises a stop-completed signal.

15. A cross view mirror for a vehicle according to claim 12, wherein one of the one or more activation or triggering signals comprises vehicle operation characteristics including one or more of engagement, disengagement, adjustment, sensitivity adjustment or field of view adjustment for one or more object detectors or sensors.

16. A cross view mirror for a vehicle according to claim 12, wherein the activation device is configured to activate said visual indicator to provide the light signals responsive to said one or more activation or triggering signals including detection of a person or object when the vehicle is stopped, moving, speeding up or slowing down.

17. A cross view mirror for a vehicle according to claim 12, further comprising an activation device configured to activate one or more devices responsive to an activation signal generated by said visual indicator.

18. A cross view mirror for a vehicle, comprising:
 a housing having a rear side and a front side opposing to the rear side, the housing is configured to be secured to a mounting arm which is mountable to the vehicle;
 a retaining rim positioned on the front side of the housing having a top side and a bottom side opposing to the top side;
 a convex mirror lens secured between the housing and the retaining rim; and
 a visual indicator comprising a light emitting diode device that extends along the top side of the retaining rim for providing light signals to warn an operator driving the vehicle when an object or person is detected in a lane next to or in front of a vehicle, wherein the visual indicator is mounted to at least one of the retaining rim or the housing.

19. A cross view mirror for a vehicle according to claim 18, wherein the housing is secured to the mounting arm by a tunnel clamp.

20. A cross view mirror for a vehicle, comprising:
 a housing having a rear side and a front side opposing to the rear side, the housing further has a bottom side configured to receive a first end of a mounting arm which is configured to be mounted to the vehicle through a second end of the mounting arm;
 a retaining rim positioned on the front side of the housing having a top side and a bottom side opposing to the top side;
 a convex mirror lens secured between the housing and the retaining rim; and
 a visual indicator comprising a light emitting diode device that extends along the top side of the retaining rim for providing light signals to warn an operator driving the vehicle when an object or person is detected in a lane next to or in front of a vehicle, wherein the visual indicator is mounted to a visual indicator mount which in turn is attached to at least one of the retaining rim or the housing.

* * * * *